(12) United States Patent
Farkas et al.

(10) Patent No.: US 10,955,098 B2
(45) Date of Patent: *Mar. 23, 2021

(54) HARVESTING, TRANSMISSION, SPECTRAL MODIFICATION AND DELIVERY OF SUNLIGHT TO SHADED AREAS OF PLANTS

(71) Applicant: OPTI-HARVEST, INC., Los Angeles, CA (US)

(72) Inventors: Daniel L. Farkas, Los Angeles, CA (US); Nicholas Booth, Covina, CA (US); Nadav Ravid, Visalia, CA (US)

(73) Assignee: OPTI-HARVEST, INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/116,435

(22) Filed: Aug. 29, 2018

(65) Prior Publication Data

US 2019/0137060 A1 May 9, 2019

Related U.S. Application Data

(63) Continuation of application No. 15/109,218, filed as application No. PCT/US2014/072837 on Dec. 30, 2014, now Pat. No. 10,132,457.

(Continued)

(51) Int. Cl.
*G02B 19/00* (2006.01)
*G02B 5/02* (2006.01)
(Continued)

(52) U.S. Cl.
CPC .............. *F21S 11/002* (2013.01); *A01G 7/04* (2013.01); *F21V 13/08* (2013.01); *F21V 33/00* (2013.01);
(Continued)

(58) Field of Classification Search
None
See application file for complete search history.

(56) References Cited

U.S. PATENT DOCUMENTS 2,940,219 A 6/1960 Schiller
3,206,892 A 9/1965 Telkes et al.
(Continued)

FOREIGN PATENT DOCUMENTS

EP 0875724 A2 11/1998
EP 1370126 A2 12/2003
(Continued)

OTHER PUBLICATIONS

Samuoliene et al., The Effect of Supplementary LED Lighting on the Antioxidant and Nutritional Properties of Lettuce, Acta Hort 952 , Jun. 2012, pp. 835-841. (Year: 2012).*
(Continued)

*Primary Examiner* — Derek S. Chapel
(74) *Attorney, Agent, or Firm* — Wilson Sonsini Goodrich & Rosati

(57) ABSTRACT

A light harvester or collector collects solar radiation from an unshaded location adjacent a growing plant. The light harvester can be either imaging (e.g., parabolic reflectors) or non-imaging (e.g., compound parabolic concentrator). The concentrated solar radiation is projected into a light transmitter that conducts the light through the plant's outer canopy and into the inner canopy to a diffuser which disperses and reradiates the light into the inner canopy. The diffused light transforms a non-productive, potentially leafless zone of the plant into a productive zone so that more fruit can be produced per volume of land surface. The system can prevent transmission of infrared into the inner canopy so that the inner canopy zone is not heated and the amount of water lost to transpiration is reduced. The system (Continued)

can also modify other spectral components to affect plant development and to control pests and diseases.

4 Claims, 8 Drawing Sheets

Related U.S. Application Data

(60) Provisional application No. 61/922,317, filed on Dec. 31, 2013.

(51) Int. Cl.
| | |
|---|---|
| G02B 5/20 | (2006.01) |
| F21S 11/00 | (2006.01) |
| A01G 7/04 | (2006.01) |
| F21V 13/08 | (2006.01) |
| F21V 33/00 | (2006.01) |
| F21V 8/00 | (2006.01) |
| A01G 9/24 | (2006.01) |
| F21W 131/109 | (2006.01) |

(52) U.S. Cl.
CPC .......... *G02B 5/0284* (2013.01); *G02B 5/208* (2013.01); *G02B 6/0096* (2013.01); *G02B 19/0042* (2013.01); *A01G 9/243* (2013.01); *F21W 2131/109* (2013.01); *Y02A 40/25* (2018.01); *Y02P 60/12* (2015.11)

(56) References Cited

U.S. PATENT DOCUMENTS

| | | | |
|---|---|---|---|
| 3,923,381 | A | 12/1975 | Winston |
| 3,931,695 | A | 1/1976 | Widmayer |
| 4,002,499 | A | 1/1977 | Winston |
| 4,003,638 | A | 1/1977 | Winston |
| 4,249,340 | A | 2/1981 | Maes, Jr. et al. |
| 4,653,223 | A | 3/1987 | Mori |
| 4,662,106 | A * | 5/1987 | Mori ............... A01G 7/045 47/17 |
| 4,969,288 | A | 11/1990 | Mori |
| 5,022,181 | A | 6/1991 | Longstaff |
| 5,412,905 | A | 5/1995 | Allison |
| 5,692,337 | A | 12/1997 | Motz, Jr. |
| 5,953,857 | A | 9/1999 | Aiga et al. |
| 6,037,535 | A | 3/2000 | Yoshino |
| 6,110,867 | A | 8/2000 | Glenn et al. |
| 6,357,172 | B1 | 3/2002 | Risgaard et al. |
| 6,701,665 | B1 | 3/2004 | Ton et al. |
| 8,171,668 | B2 | 5/2012 | Lais et al. |
| 8,458,954 | B2 | 6/2013 | Yamada et al. |
| 9,310,540 | B2 | 4/2016 | Boonekamp et al. |
| 10,132,457 | B2 * | 11/2018 | Farkas ............... A01G 9/243 |
| 1,076,507 | A1 | 9/2020 | Bottari |
| 2002/0056225 | A1 | 5/2002 | Shahak et al. |
| 2002/0170229 | A1 | 11/2002 | Ton et al. |
| 2003/0029079 | A1 | 2/2003 | Kleinert |
| 2004/0062023 | A1 | 4/2004 | Elsegood |
| 2004/0088916 | A1 | 5/2004 | Ton et al. |
| 2007/0151149 | A1 | 7/2007 | Karpinski et al. |
| 2008/0298052 | A1 | 12/2008 | Hurst et al. |
| 2009/0021934 | A1 | 1/2009 | Chu |
| 2009/0148931 | A1 | 6/2009 | Wilkerson et al. |
| 2009/0272029 | A1 | 11/2009 | Aiking et al. |
| 2009/0300983 | A1 | 12/2009 | Tilford et al. |
| 2010/0139739 | A1 | 6/2010 | Ashkin |
| 2010/0299993 | A1 * | 12/2010 | Lais ............... A01G 13/0243 47/29.4 |
| 2011/0041397 | A1 | 2/2011 | Kamahara |
| 2011/0197317 | A1 | 8/2011 | Wong |
| 2011/0211250 | A1 | 9/2011 | Laine et al. |
| 2011/0226311 | A1 | 9/2011 | Sun et al. |
| 2011/0265378 | A1 | 11/2011 | Callaway |
| 2012/0198762 | A1 | 8/2012 | Lee |
| 2013/0219783 | A1 | 8/2013 | Toye et al. |
| 2013/0326941 | A1 | 12/2013 | Pickett et al. |
| 2015/0121753 | A1 | 5/2015 | Jenner |
| 2015/0173302 | A1 * | 6/2015 | Duncan ............... A01G 22/00 47/58.1 R |
| 2015/0223402 | A1 * | 8/2015 | Krijn ............... A01G 7/045 47/58.1 LS |
| 2015/0223411 | A1 | 8/2015 | Toye et al. |
| 2015/0313091 | A1 | 11/2015 | Ara et al. |
| 2016/0000018 | A1 | 1/2016 | Van Elmpt et al. |
| 2016/0064204 | A1 | 3/2016 | Greenberg et al. |
| 2016/0157439 | A1 | 6/2016 | Greene et al. |
| 2016/0174474 | A1 | 6/2016 | Toye et al. |
| 2016/0309659 | A1 | 10/2016 | Guy et al. |
| 2016/0309660 | A1 * | 10/2016 | Duncan ............... A01G 22/00 |
| 2016/0316643 | A1 | 11/2016 | Guy et al. |
| 2016/0327228 | A1 | 11/2016 | Farkas et al. |
| 2017/0188531 | A1 | 7/2017 | Daniels |
| 2017/0233690 | A1 * | 8/2017 | Pickett ............... A01G 7/045 435/292.1 |
| 2018/0014486 | A1 | 1/2018 | Creechley et al. |
| 2020/0045895 | A1 | 2/2020 | Shahak et al. |

FOREIGN PATENT DOCUMENTS

| | | |
|---|---|---|
| EP | 1411757 A4 | 4/2008 |
| EP | 2278870 A1 | 2/2011 |
| EP | 2874488 A2 | 5/2015 |
| WO | WO-0058849 A1 | 10/2000 |
| WO | WO-0219800 A2 | 3/2002 |
| WO | WO-0235193 A2 | 5/2002 |
| WO | WO-02084248 A2 | 10/2002 |
| WO | WO-2009141287 A1 | 11/2009 |
| WO | WO-2015092799 A1 | 6/2015 |
| WO | WO-2015092800 A1 | 6/2015 |
| WO | WO-2015103310 A1 | 7/2015 |
| WO | WO-2018222923 A1 | 12/2018 |
| WO | WO-2020086763 A1 | 4/2020 |
| WO | WO-2021021916 A1 | 2/2021 |

OTHER PUBLICATIONS

Massa et al., Plant-Growth Lighting for Space Life Support: A Review, Gravitational and Space Biology 19(2) Aug. 2006, pp. 19-30. (Year: 2006).*

Ahmadi et al. The effect of greenhouse covering materials on phytochemical composition and antioxidant capacity of tomato cultivars. Journal of the Science of Food and Agriculture 98(12):4427-4435 (2018).

Bagdonavičienė et al. Cultivation of sweet pepper (*Capsicum annuum* L.) transplants under high pressure sodium lamps supplemented by light-emitting diodes of various wavelengths. Acta Sci. Pol. Hortorum Cultus 14:3-14 (2015).

Ben-Yakir et al. The effects of UV radiation on arthropods: a review of recent publications (2010-2015). Acta Hortic. 1134: 335-342 (2016).

Bian et al. Effects of light quality on the accumulation of phytochemicals in vegetables produced in controlled environments: a review. Journal of the Science of Food and Agriculture 95(5):869-877 (2015).

Buthelezi et al. Spectral quality of photo-selective nets improves phytochemicals and aroma volatiles in coriander leaves (*Coriandrum sativum* L.) after postharvest storage. Journal of Photochemistry and Photobiology B: Biology 161:328-334 (2016).

Carvalho et al. Green light control of anthocyanin production in microgreens. Acta Hortic. 1134:13-18 (2016).

Carvalho et al. Light Quality Dependent Changes in Morphology, Antioxidant Capacity, and Volatile Production in Sweet Basil (*Ocimum basilicum*). Front. Plant Sci. 7:1-14 (2016).

Chen et al. Growth and nutritional properties of lettuce affected by mixed irradiation of white and supplemental light provided by light-emitting diode. Sci. Hortic. (Amsterdam). 200:111-118 (2016).

Comas et al. Canopy and environmental control of root dynamics in a long-term study of Concord grape. New Phytologist Trust 167(3):829-840 (2005).

(56) References Cited

OTHER PUBLICATIONS

Demers et al. Effects of supplemental light duration on greenhouse tomato (*Lycopersicon esculentum* Mill.) plants and fruit yields. Sci. Hortic. (Amsterdam). 74:295-306 (1998).
Dorais. The use of supplemental lighting for vegetable crop production: Light intensity, crop response, nutrition, crop management, cultural practices. Canadian Greenhouse Conference Oct. 9, 2003 (8 pgs) (2003).
D'Souza et al. Application of Light-Emitting Diodes in Food Production, Postharvest Preservation, and Microbiological Food Safety. Compr. Rev. Food Sci. Food Saf. 14:719-740 (2015).
Dueck et al. Efficiency of light energy used by leaves situated in different levels of a sweet pepper canopy. Acta Hortic. 711:201-205 (2006).
Dzakovich et al. Tomatoes grown with light-emitting diodes or high-pressure sodium supplemental lights have similar fruit-quality attributes. HortScience 50:1498-1502 (2015).
Folta et al. Green light: A signal to slow down or stop. J. Exp. Bot. 58(12):3099-3111 (2007).
Folta et al. Light as a Growth Regulator: Controlling Plant Biology with Narrow-bandwidth Solid-state Lighting Systems. Hortscience 43:1957-1964 (2008).
Goldberg et al. Variations in the spectral distribution of daylight at various geographical locations on the earth's surface. Sol. Energy 19:3-13 (1977).
Gómez et al. Comparison of intracanopy light-emitting diode towers and overhead high-pressure sodium lamps for supplemental lighting of greenhouse-grown tomatoes. Horttechnology 23:93-98 (2013).
Gómez et al. In search of an optimized supplemental lighting spectrum for greenhouse tomato production with intracanopy lighting. Acta Hortic. 1134:57-62 (2016).
Gómez et al. Supplemental lighting for greenhouse-grown tomatoes: Intracanopy LED Towers vs. overhead HPS lamps. Acta Hortic. 1037:855-862 (2014).
Gómez et al. Testing of LEDs for Supplemental Lighting of Greenhouse-grown Tomatoes for a Northern Climate. PowerPoint. Purdue University (27 pgs) (Apr. 6, 2012).
González-Real et al. Influence of fruit sink strength on the distribution of leaf photosynthetic traits in fruit-bearing shoots of pepper plants (*Capsicum annuum* L.). Environ. Exp. Bot. 66:195-202 (2009).
Gunnlaugsson et al. Interlight and plant density in year-round production of tomato at northern latitudes. Acta Hortic. 711:71-75 (2006).
Guo et al. Effect of LED interlighting combined with overhead HPS light on fruit yield and quality of year-round sweet pepper in commercial greenhouse. Acta Hortic. 1134:71-78 (2016).
Hao et al. LED inter-lighting in year-round greenhouse mini-cucumber production. Acta Hortic. 956:335-340 (2012).
Hasan et al. An Overview of LEDs' Effects on the Production of Bioactive Compounds and Crop Quality. Molecules 22(9):1420 (2017).
Hawley et al. Improving Cannabis Bud Quality and Yield with Subcanopy Lighting. Hort Science 53(11):1593-1599 (2018).
Hemming. Use of natural and artificial light in horticulture-interaction of plant and technology, in: Proceedings of the VI International Symposium on Light in Horticulture. pp. 15-19 (2011).
Hernández et al. Tomato seedling growth and morphological responses to supplemental LED lighting red:Blue ratios under varied daily solar light integrals. Acta Hortic. 956:187-194(2012).
Horváth et al. Polarization Pattern of Freshwater Habitats Recorded by Video Polarimetry in Red, Green and Blue Spectral Ranges and Its Relevance for Water Detection by Aquatic Insects. The Journal of Experimental Biology 200:1155-1163 (1997).
Hovi et al. Interlighting improves production of year-round cucumber. Sci. Hortic. (Amsterdam). 102:283-294 (2004).
Hovi-Pekkanen et al. Increasing productivity of sweet pepper with interlighting. Acta Hortic. 711:165-170 (2006).

Jacovides et al. Global photosynthetically active radiation and its relationship with global solar radiation in the Eastern Mediterranean basin. Theor. Appl. Climatol. 74:227-233 (2003).
Johkan et al. Effect of green light wavelength and intensity on photomorphogenesis and photosynthesis in Lactuca sativa. Environ. Exp. Bot. 75:128-133 (2012).
Kim et al. Green-light supplementation for enhances lettuce growth under red- and blue-light-emitting diodes. HortScience 39:1617-1622 (2004).
Korczynski et al. Mapping monthly distribution of daily light integrals across the contiguous United States. Horttechnology 12:12-16 (2002).
Kriska et al. Why do red and dark-coloured cars lure aquatic insects? The attraction of water insects to car paintwork explained by reflection-polarization signals. Proc. Biol. Sci. 273(1594):1667-1671 (2006).
Landis et al. Light Emitting Diodes (LED)—Applications in Forest and Native Plant Nurseries. Forest Nursery Notes Summer 2013 (9 pgs).
Li et al. Effects of light-emitting diode supplementary lighting on the winter growth of greenhouse plants in the yangtze river delta of China. Bot. Stud. 57:2 (2016).
Lu et al. Effects of Supplemental Lighting with Light-Emitting Diodes (LEDs) on Tomato Yield and Quality of Single-Truss Tomato Plants Grown at High Planting Density. Environ. Control Biol. 50:63-74 (2012).
Marcelis et al. Flower and fruit abortion in sweet pepper in relation to source and sink strength. J. Exp. Bot. 55:2261-2268 (2004).
Mathejczyk et al. Sensing Polarized Light in Insects. Oxford Research Encyclopeida of Neuroscience (34 pgs) (2017).
Mitchell et al. Chapter 1: Light-Emitting Diodes in Horticulture. Hortic. Rev. (Am. Soc. Hortic. Sci). 43:1-88 (2015).
Mitchell. Academic Research Perspective of LEDs for the Horticulture Industry. HortScience 50:1293-1296 (2015).
Morrow. LED lighting in horticulture. HortScience 43:1947-1950 (2008).
Muneer et al. Influence of green, red and blue light emitting diodes on multiprotein complex proteins and photosynthetic activity under different light intensities in lettuce leaves (*Lactuca sativa* L.). Int. J. Mol. Sci. 15:4657-4670 (2014).
Nelson et al. Economic analysis of greenhouse lighting: Light emitting diodes vs. high intensity discharge fixtures. PLoS One 9(6):e99010 (2014).
Olle et al. The effects of light-emitting diode lighting on greenhouse plant growth and quality. Agric. Food Sci. 22:223-234 (2013).
Ouzounis et al. Spectral effects of artificial light on plant physiology and secondary metabolism. Hortscience 50:1128-1135 (2015).
PCT/US2018/065343 International Search Report and Written Opinion dated Mar. 5, 2019.
Pepin et al. Beneficial effects of using a 3-D LED interlighting system for organic greenhouse tomato grown in Canada under low natural light conditions, in: Acta Horticulturae. International Society for Horticultural Science (ISHS), Leuven, Belgium, pp. 239-246 (2014).
Pregitzer et al. Responses of tree fine roots to temperature. New Phytologist, 147(1):105-115 (2000).
Samuoliene et al. LED lighting and seasonality effects antioxidant properties of baby leaf lettuce. Food Chem. 134:1494-1499 (2012).
Shahak et al. The wonders of yellow netting. Acta Hortic. 1134:327-334 (2016).
Shashar et al. Migrating locusts can detect polarized reflections to avoid flying over the sea. Biology Letters 1:472-475 (2015).
Shifriss et al. Variation in flower abscission of peppers under stress shading conditions. Euphytica 78:133-136 (1994).
Singh et al. LEDs for energy efficient greenhouse lighting. Renew. Sustain. Energy Rev. 49:139-147 (2015).
Smith et al. Don't ignore the green light: exploring diverse roles in plant processes. J. Exp. Bot. 68:2099-2110 (2017).
Snowden et al. Sensitivity of seven diverse species to blue and green light: Interactions with photon flux. PLoS One 11:1-32 (2016).

(56) References Cited

OTHER PUBLICATIONS

Song et al. Polychromatic Supplemental Lighting from underneath Canopy Is More Effective to Enhance Tomato Plant Development by Improving Leaf Photosynthesis and Stomatal Regulation. Front. Plant Sci. 7:1832 (2016).
Tewolde et al. Nighttime Supplemental LED Inter-lighting Improves Growth and Yield of Single-Truss Tomatoes by Enhancing Photosynthesis in Both Winter and Summer. Front. Plant Sci. 7:448 (2016).
Thimijan et al. Photometric, radiometric, and quantum light units of measure: a review of procedures for interconversion. HortScience 18:818-822 (1983).
Trouwborst et al. The responses of light interception, photosynthesis and fruit yield of cucumber to LED-lighting within the canopy. Physiol. Plant. 138:289-300 (2010).
Turner et al. Dry Matter Assimilation and Partitioning in Pepper Cultivars Differing in Susceptibility to Stress-induced Bud and Flower Abscission. Ann. Bot. 73(6):617-622 (1994).
Wehner. Polarized-light navigation by insects. Scientific American 23(1):106-115 (1976).
Wubs et al. Abortion of reproductive organs in sweet pepper (*Capsicum annuum* L.): a review. J. Hortic. Sci. Biotechnol. 84:467-475 (2009).
Zhou et al. Effects of photoselective netting on root growth and development of young grafted orange trees under semi-arid climate. Scientia Horticulturae 238:272-280 (2018).
Zhu et al. From lab to field, new approaches to phenotyping root system architecture. Current Opinion in Plant Biology 14:(3):310-317 (2011).
Antignus. Chapter 1: Management of Air-Borne Viruses by "Optical Barriers" in Protected Agriculture and Open-Field Crops. Advances in Virus Research 90:1-33 (2014).
Antignus et al. Ultraviolet-absorbing barriers, an efficient integrated pest management tool to protect greenhouses from insects and virus diseases. In Insect Pest Management. pp. 319-335 (2004).
Baranov. Device for Restricting in One Plane the Angular Aperture of a Pencil of Rays from a Light Source. (in Russian). Russian certificate of authorship 200530, published Oct. 31, 1967.
Baranov et al. Study of the illumination characteristics of hollow focons. Soviet Journal of Optical Technology 33:408-411 (1966).
Baranov. Geliotekhnika 2:11-14 [English transl.: Parabolotoroidal mirrors as elements of solar energy concentrators. Appl Sol Energy 2:9-12.] (1966).
Baranov. Properties of parabolic focons. Opt Mekh Prom 6:1-5 (1965).
Bauerle et al. A fiberoptic-based system for integrating photosynthetically active radiation in plant canopies. HortScience 39(5):1027-1029 (2004).
Baylor et al. Light and photon capture in turtle receptors. J Physiol 248:433-464 (1975).
Beggs et al. Photocontrol of flavonoid biosynthesis. In: Photomorphogenesis in Plants, pp. 733-751 (1994).
Ben-Yakir et al. Colored shading nets impede insect invasion and decrease the incidences of insect transmitted viral diseases in vegetable crops. Entomol. Exp. et Appl. 144:249-257 (2012).
Ben-Yakir et al. Optical manipulation of insect pests for protecting agricultural crops. Acta Hort 956:609-616 (2012).
Ben-Yakir et al. Photoselective nets and screens can reduce insect pests and diseases in agricultural crops. Acta Hort 1015:95-102 (2014).
Ben-Yakir et al. Chapter 12. Optical Manipulations: An advance Approach for Controlling Sucking Insect Pests. In: Advanced Technologies for Managing Insect, pp. 249-267 (2012).
Briggs et al. Photomorphogenesis—from One Photoreceptor to 14: 40 Years of Progress. Mot Plant 5(3):531-532 (2012).
Briggs et al. Photoreceptors in Plant photomorphogenesis to date. Five phytochromes, two cryptochromes, one phototropin, and one superchrome. Plant Physiol. 125:85-88 (2001).
Dueck et al. Influence of diffuse glass on the growth and production of tomato. Acta Hort 956:75-82 (2012).

Dufault et al. Enhancing the Productivity and Fruit Quality of Forced "Sweet Charlie" Strawberries Through Manipulation of Light Quality in High Tunnels. International Journal of Fruit Science 9(2):176-184 (2009).
Feuermann et al. High-Concentration Photovoltaic Designs Based on Miniature Parabolic Dishes. Solar Energy 90(5):423-430 (2001).
Glenn et al. Particle film: a new technology for agriculture. Hortic. Rev 31:1-43 (2005).
Glenn. Particle Film Mechanisms of Action That Reduce the Effect of Environmental Stress in 'Empire' Apple. J Amer Soc Hort Sci 134(3):314-321 (2009).
Gordon et al. Solar Surgery. J. Applied Physics 93(8):4843-4851 (2003).
Harper et al. Heat trap: An optimized far infrared field optics system. Appl. Opt. 15:53-60 (1976).
Healey et al. Radiation use efficiency increases when the diffuse component of incident radiation is enhanced under shade. Australian Journal of Agricultural Research 49(4):665-672 (1998).
Hemming et al. Light diffusion improves growth. Flower Tech 10(6):24-25 (2007).
Hemming et al. The Effect of Diffuse Light on Crops. Acta Hort. 801:1293-1300 (2008).
Hemming. Use of Natural and Artificial Light in Horticulture—Interaction of Plant and Technology. Acta Hort 907:25-35 (2011).
Hinterberger et al. Efficient light coupler for threshold Cerenkov counters. Rev Sci Instrum 37:1094-1095 (1966a).
Hinterberger et al. Gas Cerenkov counter with optimized light-collecting efficiency. Proc Int Conf Instrum High Energy Phys. pp. 205-206 (1966b).
Jokinen et al. Improving sweet pepper productivity by led interlighting. Acta Hort 956:59-66 (2012).
Karpinski et al. Light perception in plant disease defense signaling. Current Opinion in Plant Biology 6:390-396 (2003).
Kasperbauer. Light and plant development. In: Plant-environment Interactions, pp. 83-123 (1994).
Kong et al. Pearl netting affects postharvest fruit quality in 'Vergasa' sweet pepper via light environment manipulation. Scientia Hort 150:290-298 (2012).
Kozai. Plant factory in Japan—Current situation and perspectives. Chronica Horticulturae 53(2):8-10 (2013).
Lin. Plant blue-light receptors. Trends Plant Sci 5:337-342 (2000).
Mercado et al. Impact of changes in diffuse radiation on the global land carbon sink. Nature 458:1014-1017 (2009).
Mohr. Coaction between pigment systems. In: Photomorphogenesis in Plants, pp. 353-373 (1994).
Mortensen et al. Effects of selective screening of the daylight spectrum, and of twilight on plant growth in greenhouses. Acta Hort. 305:103-108 (1992).
Nissim-Levi et al. Light-scattering shade net increases branching and flowering in ornamental pot plants. J Hort Sci Biotech 83:9-14 (2008).
Oren-Shamir et al. Coloured shade nets can improve the yield and quality of green decorative branches of Pittosporum variegatum. J Hort Sci Biotech 76:353-361 (2001).
PCT/US2014/072837 International Preliminary Report on Patentability Chapter II dated Apr. 26, 2016.
PCT/US2014/072837 International Search Report and Written Opinion dated Apr. 20, 2015.
Ploke. Axially Symmetrical Light Guide Arrangement. German Patent Application #14722679 (1969).
Ploke. Lichtfuhrungseinrichtungen mit starker Konzentrationswirkung [English Trans. Light guide means with a strong concentration effect]Optik 25:31-43 (1967) (English Abstract).
Rabe. Citrus tree spacing and tree shape: Concept, effect on early production profile and fruit quality aspects—An overview. Int. Soc. Citriculture 1:297-301 (2004).
Rabl et al. Ideal concentrators for finite sources and restricted exit angles. Appl. Opt. 15:2880-2883 (1976).
Rajapakse et al. Chapter 12: Light quality manipulation by horticulture industry. In: Light and Plant Development, pp. 290-312 (2007).

(56) References Cited

OTHER PUBLICATIONS

Rajapakse et al. Influence of spectral filters on growth and postharvest quality of potted miniature roses. Scientia Hort 56:245-255 (1994).
Rajapakse et al. Plant height control by photoselective filters: current status and future prospects. Hortechnology 9:618-624 (1999).
Rajapakse et al. Spectral filters and growing season influence growth and carbohydrate status of Chrysanthemum. J Amer Soc Hort Sci 120:78-83 (1995).
Runkle et al. Specific functions of red, far-red, and blue light in flowering and stem extension of long-day plants. J Am Soc Hortic Sci 126:275-282 (2001).
Senthilkumar et al. Design and Development of a Three Dimensional Compound Parabolic Concentrator and Study of Optical and Thermal Performance. Intl J Energy Sci 2(2):64-68 (2012).
Shahak et al. ColorNets: A new approach for light manipulation in fruit trees. Acta Hort. 636:609-616 (2004).
Shahak et al. ColorNets: crop protection and light-quality manipulation in one technology. Acta Hort. 659(1):143-151 (2004).
Shahak et al. Improving solar energy utilization, productivity and fruit quality in orchards and vineyards by photoselective netting. Acta Hort. 772:65-72 (2008).
Shahak. Photoselective netting: an overview of the concept, R&D and practical implementation in agriculture. Acta Hort 1015:155-162 (2014).
Shahak. Photoselective netting for improved performance of horticultural crops. A review of ornamental and vegetable studies carried in Israel. Acta Hort 770:161-168 (2008).
Sinclair et al. Variation in Crop Radiation-Use Efficiency with Increased Diffuse Radiation. Crop Sci. 32:1281-1284 (1992).
Spalding et al. Illuminating topics in plant photobiology. Plant Cell Environ 28:39-53 (2005).
Tatineni et al. Effectiveness of plant growth regulators under photoselective greenhouse covers. J Amer Soc Hort Sci 125:673-778 (2000).
Thomas. Specific effects of blue light on plant growth and development. (Literature review). In: Plants and the daylight spectrum, pp. 443-459 (1981).
U.S. Appl. No. 15/109,218 Office Action dated Mar. 27, 2018.
Van Haeringen. The development of solid spectral filters for the regulation of plant growth. Photochem. Photobiol. 67:407-413 (1998).
Warrington et al. The influence of blue- and red-biased light spectra on the growth and development of plants. Agric. Meteorol. 16:247-262 (1976).
Williamson. Cone channel condenser optics. J Opt Soc Am 42:712-715 (1952).
Winston et al. Principles of cylindrical concentrators for solar energy. Sol. Energy 17:255-258 (1975).
Winston. Light collection within the framework of geometrical optics. J. Opt. Soc. Am. 60:245-247 (1970).
Winston. Principles of solar concentrators of a novel design. Sol. Energy 16:89-95 (1974).
Witte. Cone channel optics. Infrared Phys. 5:179-185 (1965).
Bryla et al. Root respiration in citrus acclimates to temperature and slows during drought. Plant, Cell and Environment 20:1411-1420 (1997).
Coombe. Visual behaviour of the greenhouse whitefly, Trialeurodes vaporariorum. Physiological Entomology 7:243-251 (1982).
Coombe. Wavelength specific behaviour of the whitefly Trialewodes vaporariorum (Homoptera: Aleyrodidae). J Compl Physiol 144:83-90 (1981).
Doring et al. Spectral sensitivity of the green photoreceptor of winged pea aphids. Physiological Entomoly 36(4):392-396 (2011).
Fitter et al. Root production and turnover in an upland grassland subjected to artificial soil warming respond to radiation flux and nutrients, not temperature. Oecologia 120(4):575-581 (1999).

Katterer et al. Fine-root dynamics, soil moisture and soil carbon content in a Eucalyptus globulus plantation under different irrigation and fertilisation regimes. Forest Ecology and Management 74(1-3):1-12 (1995).
Kirchner et al. Evidence for trichromacy in the green peach aphid, *Myzus persicae* (Sulz.) (Hemiptera: Aphididae). Journal of Insection Physiology 51(11):1255-1260 (2005).
Mellor et al. Spectral efficiency of the glasshouse whitefly Trialeurodes vaporariorum and Encarsia formosa its hymenopteran parasitoid. Entomol Exp Appl 83:11-20 (1997).
Straw et al. Influence of Sticky Trap Color and Height Above Ground on Capture of Alate Elatobium abietinum (Hemiptera: Aphididae) in Sitka Spruce Plantations. Environmental Entomology 40(1):120-125 (2011).
Thompson et al. Patterns of gas exchange, photosynthate allocation, and root growth during a root growth capacity test. Canadian Journal of Forest Research 22(2):248-254 (1992).
Tierney et al. Environmental control of fine root dynamics in a northern hardwood forest. Global Change Biology 9(5):670-679 (2003).
Vaishampayan et al. Spectral Specific Responses in the Visual Behavior of the Greenhouse Whitefly, Trialeurodes Vaporariorum (Homoptera: Aleyrodidae). Entomologia Experimentalis et Applicata 18(3):344-356 (1975).
Vaishampayan et al. Visual and Olfactory Responses in Orientation to Plants by the Greenhouse Whitefly, Trialeurodes Vaporariorum (Homoptera: Aleyrodidae). Entomologia Experimentalis et Applicata 18(4):412-422 (1975).
Vernon et al. Spectral Responsiveness of Frankliniella occidentalis (Thysanoptera: Thripidae) Determined by Trap Catches in Greenhouses. Environmental Entomology 19(5):1229-1241 (1990).
Yaku et al. Thrips see red—flower colour and the host relationships of a polyphagous anthophilic thrips. Ecological Entomology 32(5):527-535 (2007).
The Secret Gift of Polarized Vision. Insect P-Ray Vision. The Secret in the Eye. Available at https://www.polarization.com/eyes/eyes.html (Downloaded Sep. 30, 2019) (6 pgs).
Dokoozlian et al. Table grape canopy management and training systems. In: Report of Research for Fresh Table Grapes. Calif. Table Grape Comm., Fresno, CA. (10 pgs) (2001).
Dokoozlian et al. Vine training and trellising systems for table grapes. In: Report of Research for Fresh Table Grapes. Calif. Table Grape Comm., Fresno, CA. (9 pgs) (1993).
PCT/US2019/057727 International Search Report and Written Opinion dated Jan. 16, 2020.
Peacock. Directing Vine Physiology towards Production. In: Proceedings San Joaquin Valley Table Grape Seminar. Calif. Table Grape Comm., Fresno, CA. (4 pgs) (2005).
Peacock et al. Canopy management and trellising systems for Thompson Seedless table grapes. In: Report of Research for Fresh Table Grapes. Calif. Table Grape Comm., Fresno, CA. (4 pgs) (1996).
Peacock et al. Research Sheds Light on Bud Fruitfulness and Berry Set. In: UCCE Tulare County Grape Notes, vol. 2, Issue 2, W.L. Peacock, Ed. Tulare, CA. (2005).
Peacock et al. Training-trellis systems and canopy management of table grapes in California. International Symposium on Table Grape Production. JoAnne M. Rantz, Ed. Am. Soc. Enol. Vitic. pp. 191-194. (1994).
Peacock. Vine Physiology and Table Grape Production. In: Proceedings San Joaquin Valley Table Grape Seminar. Calif. Table Grape Comm., Fresno, CA. (7 pgs) (2006).
Peacock et al. Response of Flame Seedless table grapes to leaf removal at various stages of fruit development. In: Proc. Table Grape Seminar, N.C. Dokoozlian, Ed. UC Coop. Ext., UC Kearney Research and Extension Center, Parlier, CA. (1994).
U.S. Appl. No. 16/526,790 Office Action dated Dec. 22, 2020.

\* cited by examiner

HARVESTING, TRANSMISSION, SPECTRAL MODIFICATION AND DELIVERY OF SUNLIGHT TO SHADED AREAS OF PLANTS

CROSS-REFERENCE TO PRIOR APPLICATIONS

This application is a continuation application of U.S. application Ser. No. 15/109,218, filed Jun. 30, 2016, and claims the benefit of International Application No. PCT/US2014/072837 entitled "HARVESTING, TRANSMISSION, SPECTRAL MODIFICATION AND DELIVERY OF SUNLIGHT TO SHADED AREAS OF PLANTS" filed Dec. 30, 2014, which claims the benefit of U.S. Provisional Patent Application No. 61/922,317 entitled "HARVESTING, TRANSMISSION, SPECTRAL MODIFICATION AND DELIVERY OF SUNLIGHT TO SHADED AREAS OF PLANTS" filed on Dec. 31, 2013, each application incorporated herein by reference in its entirety.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BACKGROUND OF THE INVENTION

This invention relates to a device for improving the growth and productivity of plants by harvesting, tunneling, modifying and delivering light into the shaded areas of plants.

DESCRIPTION OF THE BACKGROUND

It is well known that plant development including growth, flowering and fruit production is dependent upon and is regulated by light energy. Solar radiation provides the energy for photosynthesis, the process by which atmospheric carbon is "fixed" into sugar molecules thereby providing the basic chemical building blocks for green plants as well as essentially all life on Earth. In addition, light is involved in the natural regulation of how and where the photosynthetic products are used within the plant and in the regulation of all photomorphogenetic and photoperiodic related processes. Plants can sense the quality (i.e., color), quantity and direction of light and use such information as signals to optimize their growth and development. This includes various "blue light" responses which may depend on UVA and UVB ultraviolet wavelengths as well as traditional "blue" wavelengths. These regulatory processes involve the combined action of several photoreceptor systems, which are responsible for the detection of specific parts of the sunlight spectrum, including far-red (FR) and red (R) light, blue light, and ultra violet (UV) light. The activated photoreceptors initiate signal transduction pathways, which culminate in morphologic and developmental processes (Warrington and Mitchell, 41; Briggs and Lin, 12; Kasperbauer, 23). The photosynthetically active radiation (PAR) ranges between 400-700 nm, because chlorophyll-protein complexes within the chloroplasts absorb the blue as well as the red part of the light spectrum. However, chlorophyll absorbs little of the green part of the spectrum which, of course, is why photosynthetic plants generally appear green in color.

Generally, low-to-medium light intensities are sufficient to drive photomorphogenetic and photoperiodic processes, while for photosynthesis the total amount of sunlight energy is a major factor dictating plant productivity. Light is often the limiting factor for agricultural production even in sunny climates. The more light intercepted by leaves of agricultural crops, the higher the productivity of those crops. In other words, the photosynthetic capacity of plants is often not saturated by available solar energy. Generally, the plant's chloroplasts adjust to the amount of available solar energy. Photosynthesis of chloroplasts in leaves exposed to maximum levels of light will saturate only at high light fluxes. However, all of the leaves of a plant cannot all be exposed to maximum solar radiation because the leaves are arranged to form a "canopy" in which there will be minimal mutual shading by the outer leaves. Some of the light, mostly the scattered part, passes between the outer leaves to be absorbed by the inner leaves. These leaves generally receive lower levels of solar radiation and will saturate at light fluxes insufficient to saturate the outer leaves because their chloroplasts adapt to low light conditions so as to saturate at lower light fluxes.

Similarly, where plants are growing close together and shade each other, the shaded leaves will become adapted to saturate at a lower light fluence. Thus, there is excess photosynthetic capacity in the plants, and if added light can be supplied to the shaded leaves, overall productivity will increase. The spacing between individual plants significantly controls the amount of effective light reaching different parts of the plant. If the individual plants are far apart, there will be more effective irradiation of plant tissue. This may result in improved growth and productivity, but if the individual plants are too far apart, there will be no gain on a unit area basis because significant amounts of solar radiation will not be intercepted by plants. Similarly, improving irradiation of plant tissue by pruning may not have the overall benefits expected because the amount of photosynthetically active plant tissue has been decreased.

Because of the efficient light absorption by chlorophyll, the light that passes through the foliage of the outer canopy arrives at the inner canopy both too low in intensity and with the wrong spectral composition. Because blue and red are preferentially absorbed by the outer canopy, mostly green light is transmitted into the inner canopy. However, green light is of little use in driving photosynthesis and as a result, fruit production, which requires a significant input of photosynthate is restricted to the external canopy. Because leaves deep within the inner parts of the canopy are unable to maintain effective levels of photosynthesis, these leaves senesce, the inner part of the canopy loses foliage and becomes non-productive. In citrus trees, for example, the productive leaf layer is estimated to be only about 100 cm deep (33). All the rest of the tree's crown is a non-productive volume that keeps increasing as the tree grows larger.

It is also known that scattered (diffused) natural light often has advantages over direct solar radiation because it partially penetrates between the leaves of the outer canopy, thereby arriving at the inner canopy essentially spectrally unmodified. In sunny climates, the outer, sun-exposed plant canopy might suffer from excessive solar radiation, which can damage (photodamage) the plant tissues and can be inhibitory (photoinhibition). That is one of the reasons for the use of horticultural "shade" cloth in such climates.

Plant pests (largely insects and arachnids) as well as fungal and bacterial diseases are also known to respond to the intensity, spectral quality and direction of sunlight. They mostly respond to the ultraviolet (UVA and UVB), blue and yellow spectral regions (2, 9). Thus, pest and disease control might be achieved by light quality and quantity manipulations.

Many horticultural and agricultural practices that have been developed through the ages have a significant effect on light interception by agricultural crops, even though in some cases this effect was not originally recognized or understood. Many of these practices are relatively inefficient and expensive due to their high labor requirements. Such practices include pruning, training and plant spacing. It is generally thought that pruning is effective because it redirects the plants growth energy and eliminates weak and/or poorly placed branches. However, in many cases (e.g., hedging, topping and removing major branches) the pruning involves the removal of vital parts of the tree. This is particularly true with "summer or green pruning" practices which remove shading foliage. These practices are both energy-wasteful (because the plant and the grower had invested a lot of energy, water and other inputs into the growth of the removed parts), and labor costly processes. One is essentially forced to sacrifice vital parts of the tree to achieve improved production by the remaining vital parts Plant and tree growth is largely controlled by the plant's search for light. Numerous pruning practices were developed to enable maximal light interception. Pruning methods include mechanical topping and hedging for height and shape control, as well as manual selective removal of dead wood, weak branches, and often also vital branches. Pruning remains one of the main tools, at present, to bring light to both the internal and external parts of the canopy. Particularly in fruit trees pruning controls the position of fruit buds and prevents them from moving farther and farther from the main trunk. Pruning has a major effect on the penetration of solar energy. By removing weak and crossing branches pruning opens up the structure of the plant and allows effective PAR light to reach closer to the main stem. Similarly, training (such as the process of espaliering a tree or vine) positions the branches so that the leaves of one branch do not shade the leaves of another branch.

Flowering is induced by photomorphogenetic processes, and is thus light-dependent. The light regime in the innermost-shaded canopy is often of too low fluence, and/or inadequate spectral composition for inducing flowering (flowering and other developmental processes respond to the ratio of red to far-red (near infrared) wavelengths. Physiological processes, such as pollination, fertilization, fruit-set and fruit development, all utterly depend on obtaining adequate carbohydrates from adjacent leaves. The carbohydrates required for fruit development cannot be adequately translocated from remote leaves. Thus, even if some flowering does occur in the inner canopy, the limited photosynthetic activity of the shaded foliage does not suffice for proper fruit development.

In some crops (e.g., peaches, table and wine grapes) green pruning of part of the foliage is practiced by growers a few weeks prior harvest for increasing light penetration, thereby significantly increasing fruit color and aromatic compounds—i.e., fruit quality. It is known that shading has particularly negative effects on fruit coloration. Fruit color development is controlled by light via several different routes. Light is the trigger for the metabolic pathways of pigment biosynthesis. Light also provides (via photosynthesis in the leaves adjacent to the fruit) the sugars that bind and stabilize the anthocyanin pigments in the colored tissue. Because, the three dimensional structure of fruit creates self-shading. The shaded side of the fruit does not develop optimum color. The biosynthesis of aromatic compounds in the fruit skin is similarly dependent on the exposure to sunlight. Both fruit coloration and aroma/flavor accumulation require light of relatively intense fluence.

There have been a number of modern cultural practices that seek to redistribute the amount of solar radiation without eliminating plant tissue. Covering the crop by light-scattering materials (glass, plastic film, photoselective translucent nets, reflective particle films, etc.; see, Glenn (14) and Glenn et al. (15)) is one way of ensuring that photosynthetically effective light reaches more of the plant body. Covering the soil with reflective films may reflect light into the interior portions of a plant's canopy. Supplemental artificial illumination (e.g., inter-crop LED illumination) is expensive both in energy to provide the illumination and capital to purchase the illuminating devices but may result in improvements in growth and yield. Genetic manipulation is another way to approach more efficient irradiation of the plant body. Breeding for more compact plants can have much the same effect as altering the spacing of plants, but a compact plant can be superior because it may pack a given leaf area into a smaller volume. Of course, excessively compact plants may exacerbate problems with self-shading. Plant volume and spacing of leaves can also be affected by grafting onto growth-regulating rootstocks and by application of growth-regulating agricultural chemicals.

The interception/collection of sunlight for useful purposes (mainly energy-related) is becoming a vibrant, mature field. Solar energy is collected to directly (e.g., photovoltaics) or indirectly (e.g., solar boilers) produce electricity. Solar energy is also collected to provide heat energy (e.g., solar water heaters). Strong competition in these areas has yielded advances in solar collector design and efficiency (including both cost-efficiency and overall functional efficiency). The current invention seeks to exploit these technologies and use collected light energy in new ways.

SUMMARY OF THE INVENTION

Additional aspects and advantages of the present disclosure will become readily apparent to those skilled in this art from the following detailed description, wherein only exemplary embodiments of the present disclosure are shown and described, simply by way of illustration of the several modes or best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

Solar radiation is both ubiquitous and is the only agriculture resource that is free of charge. Improving the utilization of this resource for agricultural production is the goal of the present invention. To achieve enhanced plant growth modern solar collectors are used to collect, concentrate and redirect solar energy. The collected sunlight is then delivered to a (lower) sub-canopy/internal location in the chosen plant (i.e., tree, grape vine, etc.), thereby stimulating plant growth and development. Illuminating the inner, most shaded volume of plants/trees improves the physiological activity and the productivity of the otherwise non- or less-productive parts of the plant. The inner canopy portion of the plant receives insufficient solar energy; so that eventually the leaves there senesce and the inner volume becomes a leafless zone. When light is delivered to this zone before the leaves senesce, the zone retains healthy functional leaves and becomes productive. The entire volume of the plant body becomes productive, thus significantly increasing the yield from a given acreage.

The present invention provides a light harvester or collector to collect solar radiation from an unshaded location adjacent a growing plant. The light harvester is preferably placed alongside or above the growing plant. It will be appreciated that the light harvester can be placed in any convenient location. Furthermore, the number or light harvesters per plant depends on the growing conditions and size of the plant (several plants per system or one, two, three or more systems per plant). The light harvester can be either imaging (e.g., parabolic reflectors) or non-imaging (e.g., compound parabolic concentrator). The non-imaging system is preferred for its simplicity, low cost and ease of construction. The concentrated solar radiation is projected into a light transmitter (either an internally reflective light pipe, an optical arrangement much like a periscope, or a bundle of optical fibers) that conducts the light through the plant's outer canopy and into the inner canopy. The conducted light enters a diffuser, which disperses and reradiates the light into the inner canopy. The diffused light provides light to drive photosynthesis as well as light to influence multiple photomorphogenetic systems. The result is that a non-productive, potentially leafless zone of the plant is transformed into a productive zone. Thus, more fruit can be produced per volume of land surface and more carbon dioxide can be sequestered in plant material (improved carbon footprint). Also, by providing light to developing fruit the quality of the fruit can be altered and improved.

It will further be appreciated that supplemental light at the proper location on a plant results in increased productivity with enhanced induction and initiation of buds resulting in increased vegetative as well as floral (fruit) growth. The enhanced production of photosynthate results in reduced bud/fruit drop and improved flower/fruit quality including better color, improved flavor (sugar/acid ratio as well as aroma/taste), improved storage characteristics and improved nutritional value. The added light (particularly if spectral modification is employed) results in growth regulation (shape of plant, etc.) without application of growth regulating chemicals. In addition, controlling the quantity and quality of light can result in reduction of plant diseases and pests without an increase in pesticide chemical application.

Because the optical systems employed can be used to prevent the transmission of infrared and near infrared radiation into the inner canopy, the inner canopy zone is not heated and the amount of water lost to transpiration is less than would be anticipated considering the increased growth in the inner canopy zone. However, when the invention is used early in the growing season, it is simple to alter the optical system to allow infrared transmission and provide growth-promoting warmth to the inner canopy. Similar optical systems can be used to change the relative amount of light at different wavelengths, thereby having a photomorphogenic effect on plant growth and development. Rather than rejecting certain wavelengths, LEDs or similar efficient light sources can be used to supplement certain wavelengths, thus attaining photomorphogenic effects.

The inventive system can be used in any plant-growing situation. While the examples provided are primarily directed towards vineyards and orchards, the system is also applicable to nurseries, all types of field crops, landscaping, home gardens as well as greenhouses of all types, lath houses, shade houses and any other plant growing structure. In a closed building (e.g., an urban garden), the light collectors can be placed on the roof and light is "piped" into the growing area. In that case, the system provides essentially all of the light. In any of the applications some or all of the light can be supplied by artificial illumination (such as LEDs). The advantage of using the system with artificial light sources is that the sources (LEDs or metal halide lamps, for example) can be located where they will be unaffected by the water, etc. inherent in agriculture which water is likely to cause electrical failures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 11b shows a ray diagram of the device of FIG. 10a;

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a system to collect solar energy and deliver it to strategic locations within the canopy of a growing plant.

Figure 1:
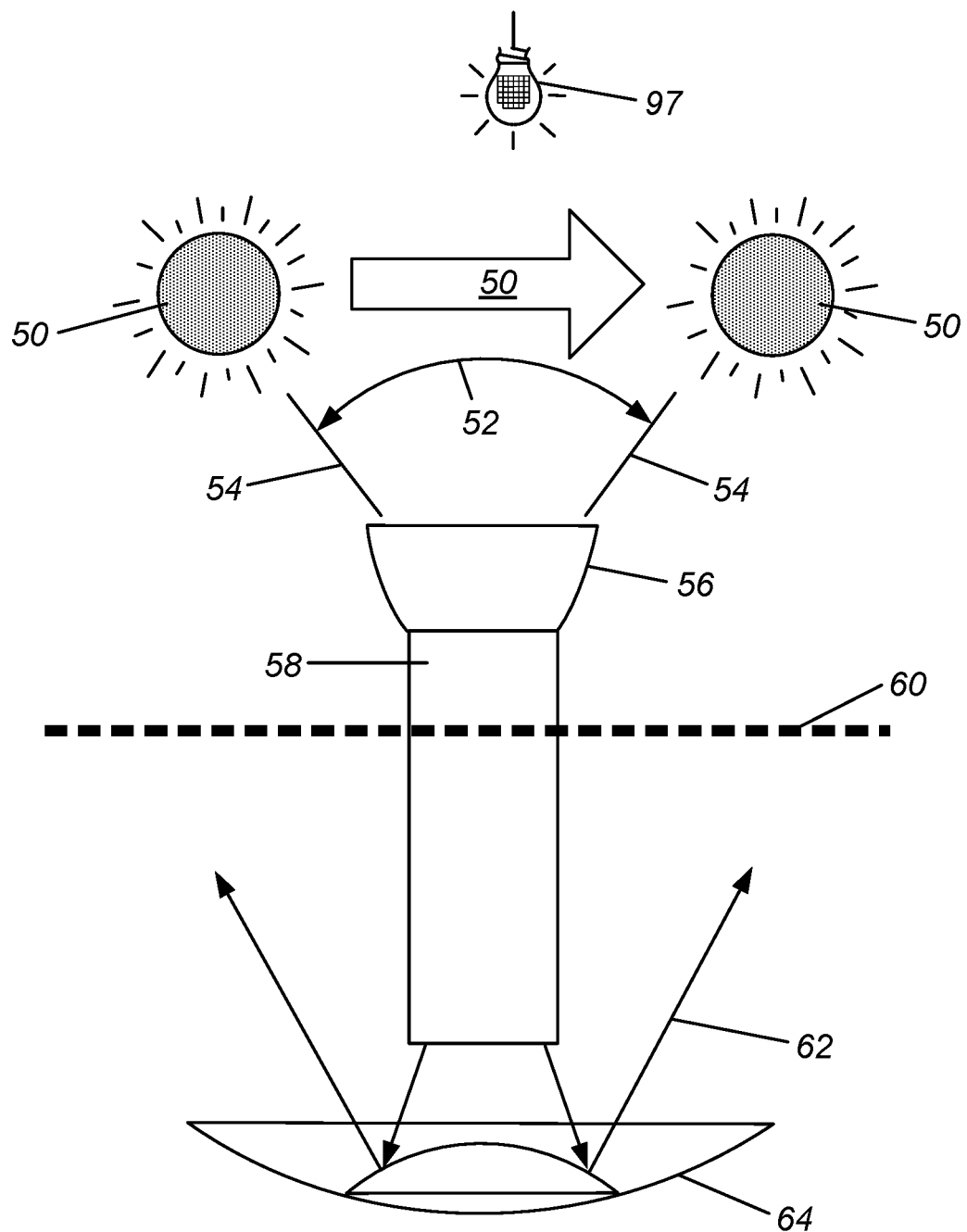
FIG. 1 shows a diagrammatic overview of one embodiment of the invention.

FIG. 1 shows a general overview of the components used in one embodiment of the present invention. The diagrammatic arrow 50 represents the daily movement of the sun 50 relative to the harvester/collector component, a compound parabolic concentrator (CPC) reflective element 56. The lines 54 represent the acceptance limits of the CPC, and these limits define the acceptance angle 52. The CPC 56 transmits light through a light pipe 58 which penetrates the canopy 60 and projects the light onto a disperser 64 which radiates the dispersed light 62 into the inner part of the canopy. A supplemental light source 97 (e.g.: LED) is also illustrated. These components will now be described in more detail.

The system harvests the natural sunlight from above/beside the plant/tree/vine/bush, and transmits it through the outer, productive canopy of plant/tree, thereby delivering and scattering it throughout the inner/lower, most shaded, non-productive portions of the foliage. A direct, reflective design for this is preferred (e.g., light beams directed by mirrors, prisms, etc.). The device is composed of three principal parts. The first component is a light harvester/collector/concentrator (generally a wide angle/compound parabolic collector, with or without a condenser system) and designed to be disposed above, or adjacent to the plants/trees.

The light harvester can comprise a number of forms, each of which could be applicable depending upon the end users agriculture needs and general environment. A preferred embodiment of the harvester design employs a reflective element known as a CPC (compound parabolic concentrator). This design has many advantages including reducing manufacturing cost, minimizing heat buildup within the system and easing installation due to its tolerance for misalignment with the sun.

Figure 2:
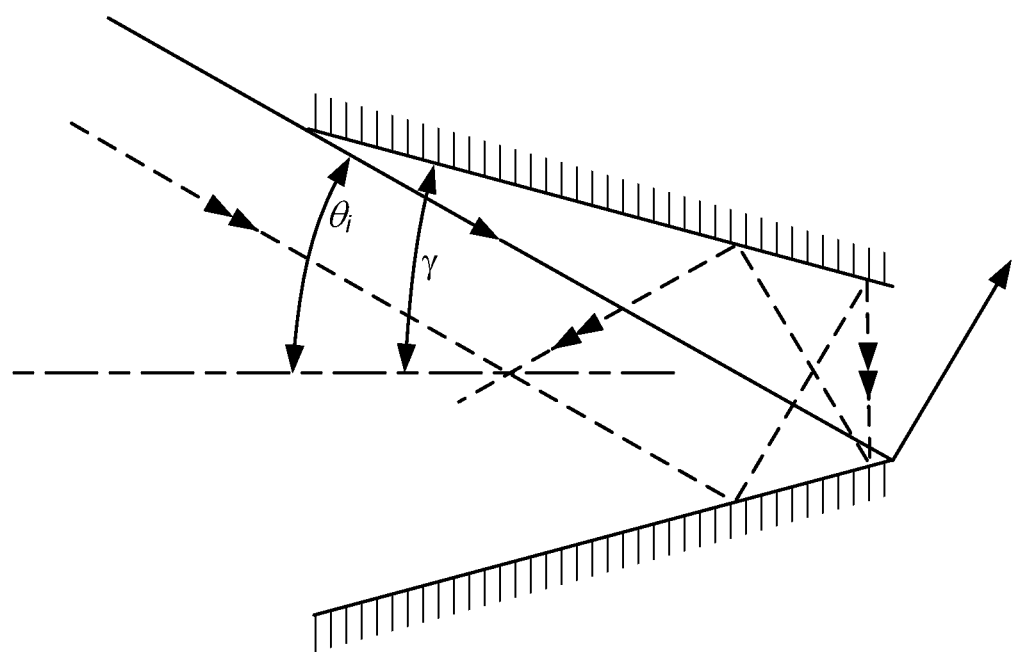
FIG. 2 shows a diagrammatic representation of a simple design that is a predecessor to the current CPC design.

The light collection and dispersal systems described herein are all based on the principle of non-imaging optics. The CPC design is an evolution of a primitive form of non-imaging concentrator, the light cone or cone concentrator, has been used for many years (see, e.g., Holter et al., 21; Senthilkumar and Yasodha, 36). FIG. 2 shows the principle. If the cone has semi-angle $\gamma$ and if $\Theta i$ is the extreme input angle, then the ray indicated will just pass after one reflection if $2\gamma=(\pi/2)-\Theta i$. It is easy to arrive at an expression for the length of the cone for a given entry aperture diameter. Also, it is easy to see that some other rays incident at angle $\Theta i$ such as the one indicated by the double arrow, will be turned back by the cone. If we use a longer cone with a larger number of reflections, we still find some rays at angle $\Theta i$ being turned back. Clearly, the cone is far from being an ideal concentrator. Williamson (42) and Witte (49) attempted some analysis of the cone concentrator but both restricted this treatment to meridian rays.

Descriptions of this type of optical device appeared in the literature in the mid-1960s in widely different contexts. Baranov and Melnikov (6) described the same principle in three-dimensional geometry, and Baranov (4) suggested three dimensional CPCs for solar energy collection. Baranov (3; 5) obtained Soviet patents on several CPC configurations. Axially symmetric CPCs were described by Ploke (30), with generalizations to designs incorporating refracting elements in addition to the light-guiding reflecting wall. Ploke (31) obtained a German patent for various photometric applications. The CPC structure was described as a collector for light from Cerenkov counters by Hinterberger and Winston (19, 20).

In other applications to light collection for applications in high-energy physics, Hinterberger and Winston (19, 20) noted the limitation to $1/\sin 2\Theta$ of the attainable concentration, but it was not until sometime later that the theory was given explicitly (Winston, 43). In the latter publication the author derived the generalized étendue and showed how the CPC approaches closely to the theoretical maximum concentration.

The CPC in two-dimensional geometry was described by Winston (44). Further elaborations may be found in Winston and Hinterberger (48) and Rabl and Winston (32). Applications of the CPC in 3D form to infrared collection (Harper et al., 16) and to retinal structure (Baylor and Fettiplace, 8) have also been described. The general principles of CPC design in 2D geometry are given in a number of U.S. patents (Winston, 45, 46, 47).

Figure 3:
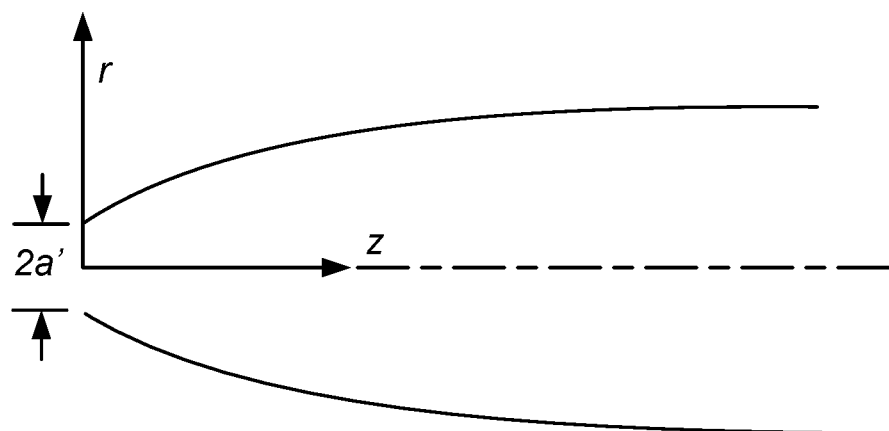
FIG. 3 shows the coordinate system used in equations describing CPC design.
Figure 4:
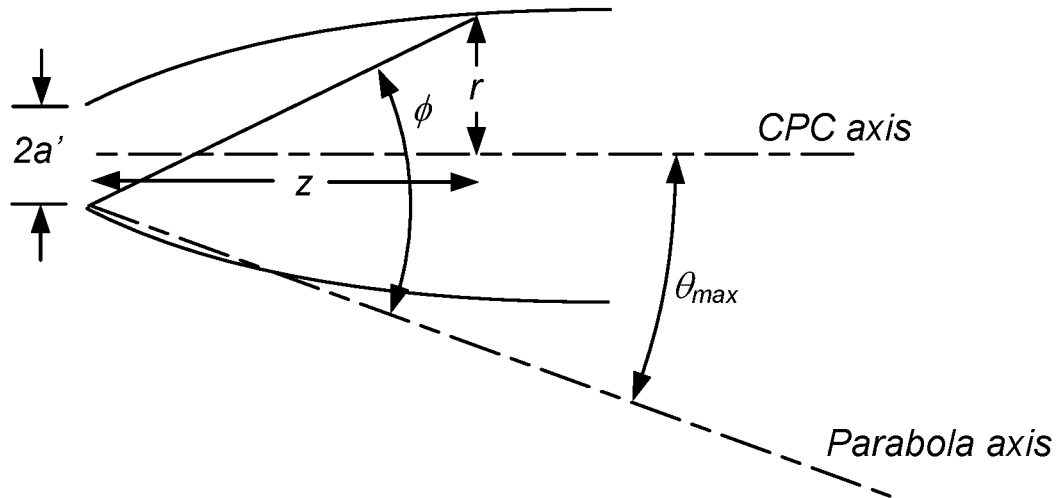
FIG. 4 shows the angle $\phi$ used in parametric equations describing the CPC.
Figure 5:
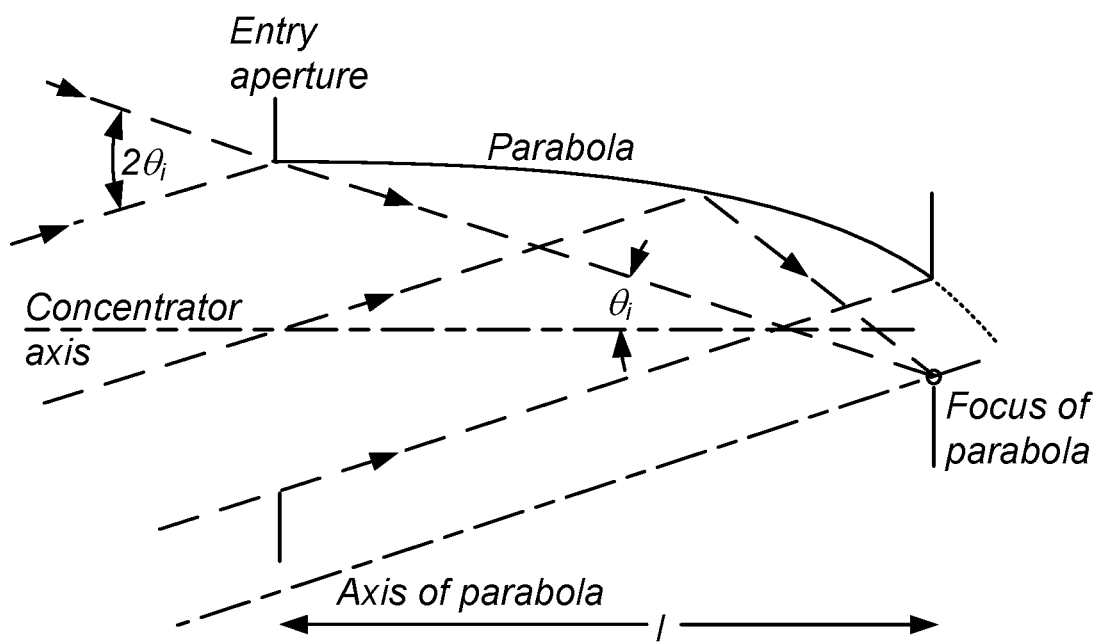
FIG. 5 shows the common descriptive terms used for the parabolic CPC.
Figure 6:
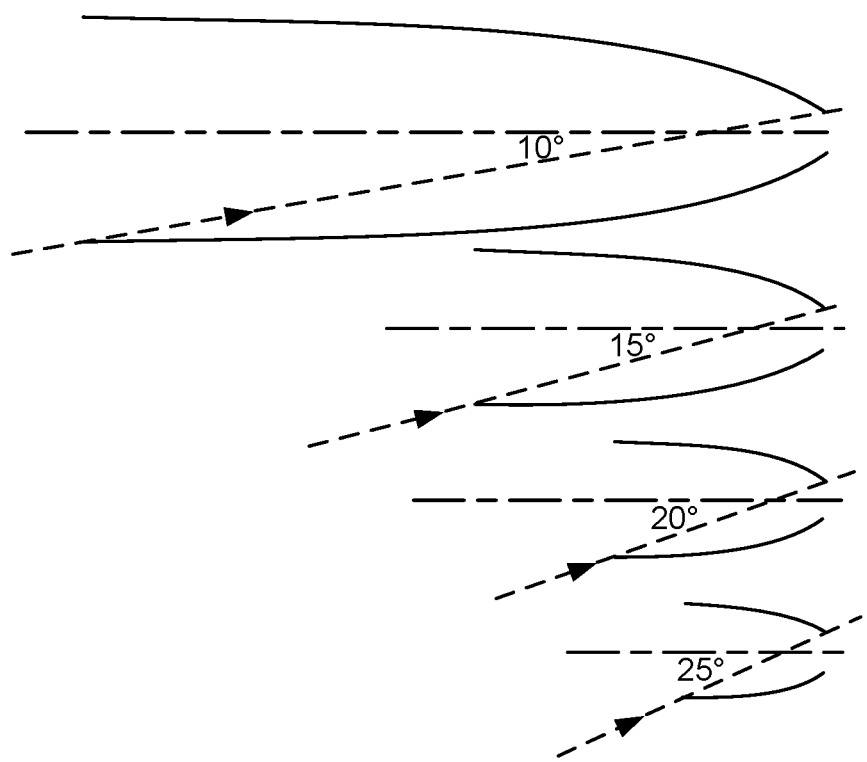
FIG. 6 shows several CPC designs with varying angles of collection.

FIG. 3 illustrates the r-z coordinate system used in mathematical description of the CPC. Whereas FIG. 4 shows the definition of angle $\phi$ used in CPC parametric equations, and FIG. 5 illustrates the descriptive terms used with the parabolic CPC to relate the various angles to the focal point of the parabola. FIG. 6 shows diagrams of four different CPC devices with angles of acceptance ranging from 10 degrees to 25 degrees (top to bottom). The diagrams are all to the same scale and all have the same size exit apertures and illustrate how the dimension change according to angle of acceptance.

The CPC light collecting design is a highly efficient way of collecting light and is utilized in nature in many optical systems including the cones of the human retina. Utilizing a CPC for the collection of sunlight delivers a number of advantages to the system.

The first advantage of the CPC collector geometry is that it possesses a large acceptance angle or numerical aperture meaning that a fixed unit can effectively collect sunlight over a wide range of angles of incidence as the sun processes overhead during the course of the day. A typical CPC with a 45 degree acceptance angle will be able to effectively collect sunlight for 6-8 hours; hence an active tracking subsystem is not required, reducing system complexity and cost. It is also possible to use two or more CPC units with different orientations to further extend the period of maximum light collection. The straightforward design and ability to use low cost materials allow for easy industrial mass production meaning that the system could be used at the density of at least one unit per tree. The large acceptance angle also allows device setup and use by non-experts, as alignment with the sun is not critical, and means once installed the collection efficiency is not sensitive to the change in position of the sun as the seasons change.

The second advantage is that the CPC design has over an imaging optical system that must track the sun to collect sufficient light is that there is much less heat generated within the device. Imaging system designs generally require fiber optics to allow for the movement of the tracking head unit. For fiber optics to efficiently transmit the light, the collected light must be concentrated into a very small area thereby causing immense heat stress on device component parts. Such systems generally require high-cost exotic materials to prevent equipment failure.

Figure 7:
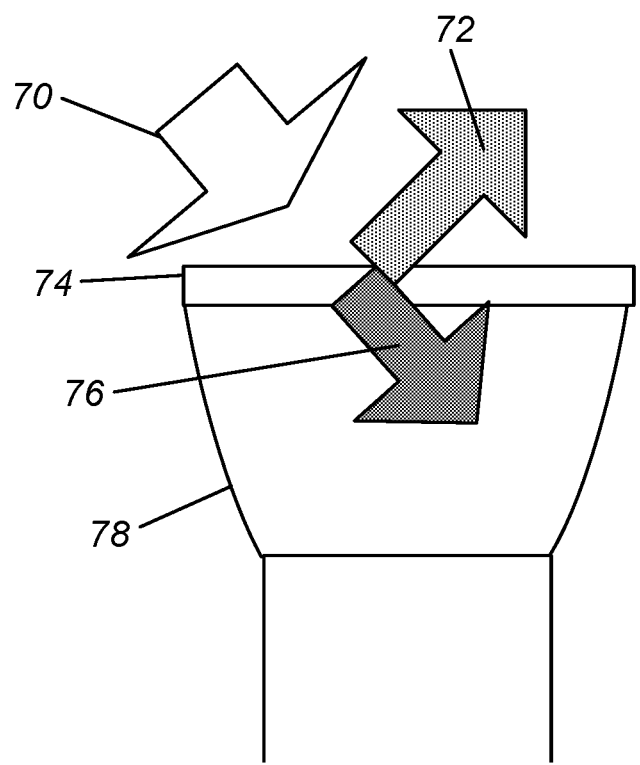
FIG. 7 is a diagram of the CPC showing heat rejection

The third advantage is the ability to vastly reduce the amount of heat entering the system and thus reduce heat stress on plants and, as a consequence, reduce plant water consumption. To enable the delivery of 'cool' light to the inner canopy the system will employ filters, such as those used in energy efficient low-E glass, at the entrance aperture of the collector as shown FIG. 7 where incoming sunlight 70 strikes a filter (dichroic) 74 covering the entry to the CPC 78. The infrared radiation 72 is rejected whereas the PAR 76 is transmitted into the CPC 78. A bonus of the overall modularity of the system is that these filters can be designed to be easily detachable. Hence, at temperate latitudes these filters could be removed in the early growing season when overall temperatures are low and the additional warmth from the collected light would be a benefit to the plants and replaced in the summer months to reduce heat stress. The fourth advantage is that imaging systems work only for clear, unobstructed sunlight, in contrast, the CPC design collects diffuse light as well as direct sunlight so that even on cloudy days extra light will be transferred to the inner canopy.

It will be appreciated that the light harvester should be located so as not to significantly shade the outer parts of the plant. Depending on the spacing of the plants, the light harvester can be placed between the rows or between the individual plants (e.g., trees) in the row, and, via the shape of the diffuser element, able to deliver light to multiple (e.g. four) trees simultaneously. To avoid shading the outer parts of the plant, the light harvester can be placed either lower than the canopy or significantly above it. If the harvester is placed significantly above the canopy, light diffraction and seasonal-diurnal movement of the harvester's shadow will avoid any significant shading of the plants. If the light harvester is placed in a low position, it will be unable to significantly shade the plants; however, the plants may significantly shade the harvester unless they are widely spaced. This militates in favor of a high location for the harvester. Because of the diffraction-movement effect mentioned above, the harvester can also be located at a distance more or less directly above the plant. The harvester will utilize the light transfer pipe as a base structural element to hold it in position. This support can be integrated with the plant itself or already existing supports (e.g., grape vine trellises).

Figure 8:
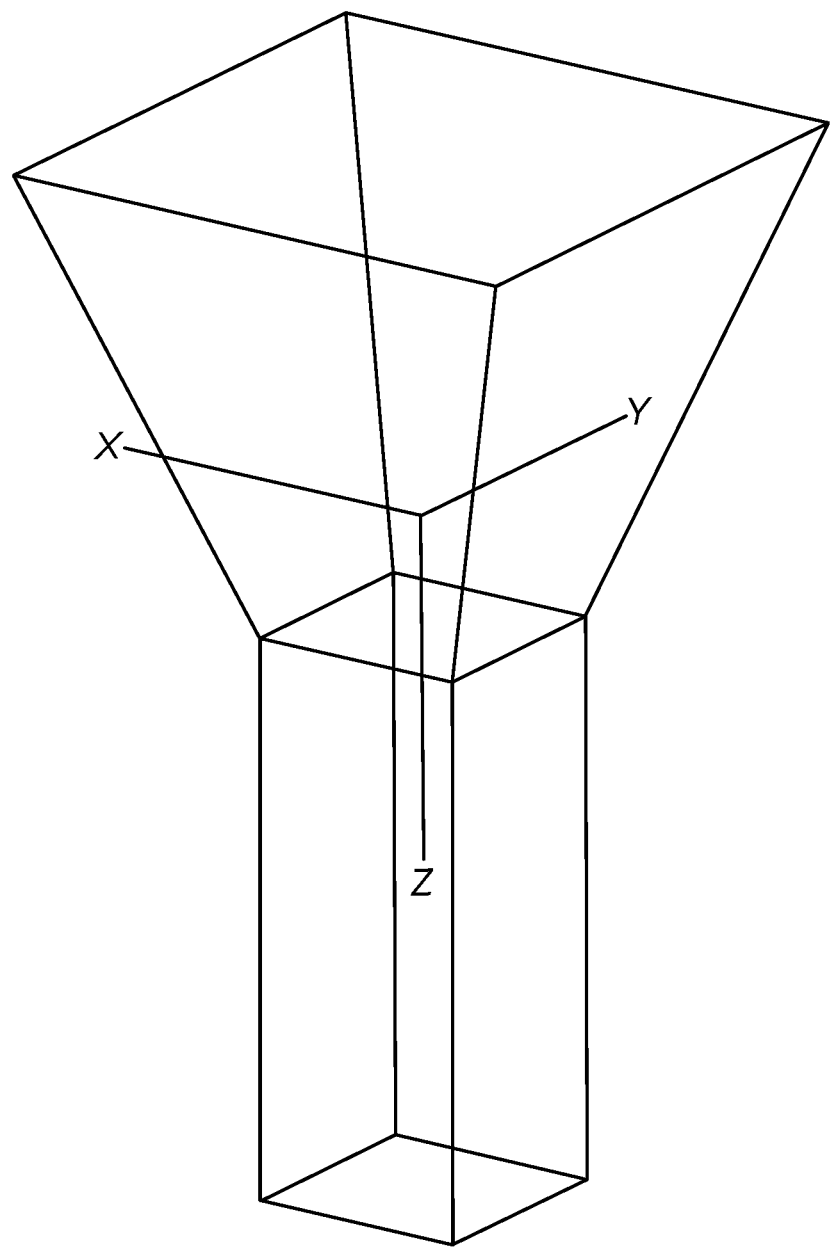
FIG. 8 shows an alternate rectangular embodiment of non-imaging light collectors.

Other embodiments of a non-imaging light harvester include geometries such as the rectangular version of FIG. 8. Harvesters with such four-fold symmetry and flat reflective surfaces offer less optical efficiency than the round CPC design. However potential advantages in modularity and the ability to flat pack (i.e., collapsibility) for transportation allow for reduced production costs. Other implementations of flat-plane designs will be obvious to those skilled in the art.

The non-imaging inventive devices described above are generally passive and operate without an additional energy source. It will be appreciated that with the exception of equatorial regions, the position of the sun in the sky changes seasonally. Therefore, for maximum efficiency solar collectors must be constantly adjusted to track the sun's position. Tracking the sun on a diurnal/continuous basis is complex and expensive due to the high cost of the technology needed. However, the seasonal changes in solar position are relatively slow; therefore, adjustment on a weekly/monthly basis by changing the collector's angle in a small number of fixed increments yields most of the advantages of daily tracking at a very low cost. A simple manual adjustment interface is provided to keep the collectors aimed in spite of seasonal change in solar position.

Figure 9:
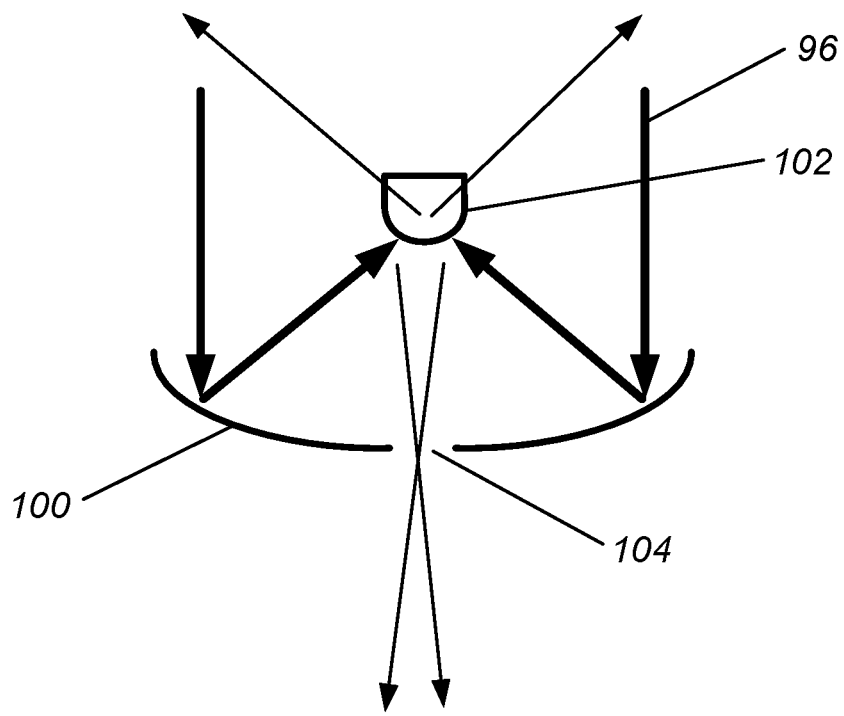
FIG. 9 shows a diagram of an imaging light harvester based on parabolic mirrors.

FIG. 9 shows an alternate embodiment on the light harvester system is based around an imaging optical system consisting of a pair of a wide angle/parabolic mirrors arranged to condense collected light into a narrow bodies transfer device such as a bundle of fibers. In this embodiment the larger diameter lower parabola 100 collects light rays 96 and reflects it onto a smaller diameter secondary parabola 102 which creates a collimated beam. This beam is directed through an aperture 104 located at the center of the larger parabola into the transfer tube (not shown). The dual parabola harvester design has optimal collection while aligned directly with the sun and efficiency falls sharply as the sun progresses across the sky throughout the day. Therefore such a system will need a mechanism to automatically move the dish to track the sun. Solar tracking technology is very mature and control mechanisms to enable its use are readily available. The additional complexity and cost of these elements can be mitigated by delivering light to a given threshold number of trees per base station. The smaller mirror 102 can advantageously by a "cold mirror" which has filter capabilities. As shown in the diagram some light (near infrared) passes through the mirror 102 and so is not concentrated and transmitted into the canopy.

Figure 11A:
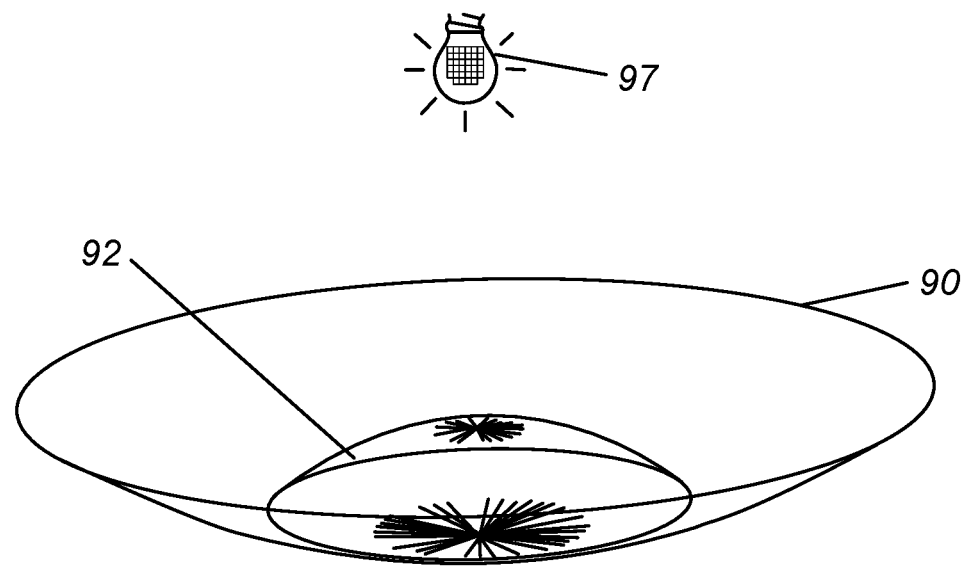
FIG. 11a is convex-concave mirror combination used as a diffuser for citrus and similar tree applications.

In addition to providing additional light for photosynthesis, the invention also allows ready adjustment of light quality. Light collected and transmitted to the lower/inner part of a plant can be modified before delivery to within/underneath to the canopy, by altering its wavelength (using optical filtration), diffusivity (by appropriately chosen diffusers), intensity (by partial obturation, if and when appropriate) all of which have been found to positively modify crop yield or quality. Adjustment of the light quality can be achieved with filters (both band-pass and dichroic) and by adding light from a supplemental source such as LEDs 97, as shown in FIGS. 1 and 11a.

Spectral optimization of light before re-delivery provides a number of advantages. Solar radiation provides heat energy as well as photosynthetic energy so that boosting the total solar irradiance to enhance photosynthesis can also result in thermal damage. It is possible to remove selected thermal components (NIR and IR) of the solar spectrum, thus avoiding over-heating the illuminated area beyond the naturally occurring microclimate. In addition, the delivered light can be wavelength-filtered to match the best known spectral signatures for productivity (Raj apakse and Shahak, 35; Shahak et al., 38, 39; Shahak, 37; Longstaff, 26), pest and disease regulation (Karpinski et al., 22; Ben-Yakir et al., 9; Antignus, 2), etc.

Figure 10:
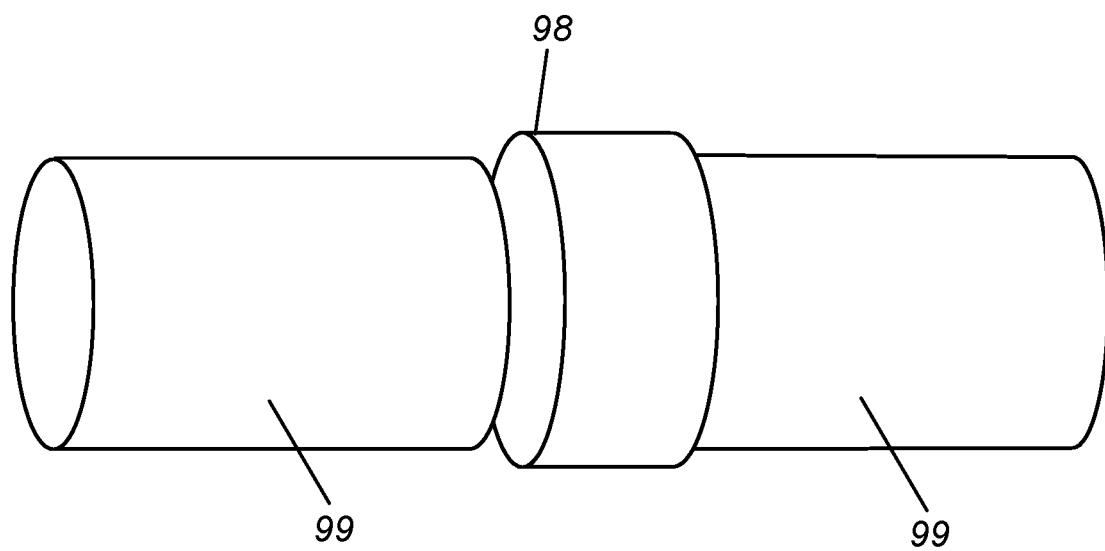
FIG. 10 shows a transmitter/conveyer.

The second component of the invention is a transmitter/conveyer that attaches to the light harvester so as to convey or transmit the concentrated solar radiation. Although the drawings generally show a single light harvester per transmitter, there is no reason that a plurality of light harvesters cannot be operatively coupled to a single transmitter. Such a transmitter can be a purely reflective system constituting as an "inverse" periscope constructed from mirrors and/or prisms. Typically the transmitter is a rigid pipe with a reflective inner surface able to penetrate through the outer plant canopy or the cover of a glass or plastic greenhouse or net-house. FIG. 10 shows such device 98. The pipe is designed such that multiple sections 99 can easily be slotted together to customize the length depending on the application scenario. The transmitter will act as the support and main anchoring point for the system as a whole, attaching either to the plant directly or to infrastructure already present such as trellis systems. This component will have cross sectional symmetry to match that of the harvester unit to allow for most efficient light transfer.

For transmission purposes an open, internally reflective pipe is generally preferable. These can be made from plastics or aluminized cardboards that are readily recyclable and can even be selected to be biodegradable. The presently preferred plastic construction of the whole device will be entirely from UL 746C (fl) certified plastics able to withstand prolonged exposure to UV, water and high temperatures. One of the beneficial features of the present invention is that by stimulating photosynthesis, the invention actually reduces atmospheric greenhouse gases (carbon dioxide). Using recyclable materials can lead to an even smaller carbon footprint for the entire system.

Another embodiment of the transmitter subsystem is a dense bundle of flexible optical fibers in a flexible protective sheath that can be threaded through the outer plant canopy or the cover of a glass or plastic greenhouse or net-house. Optical fibers have previously been used to monitor penetration of light through plant canopy layers (Bauerle and Bowden, 7) but not to actively deliver light into plant canopies. For communication (i.e., data transmission) purposes optical fibers are generally formed from high purity glass so that signals can be transmitted for great distances without significant attenuation. For the present invention it is often more economical and ecological to use optical fibers made of plastic. Although plastic optical fibers (POF) show greater attenuation than glass fibers, plastic is readily recyclable and can even be selected to be biodegradable. The presently preferred plastic fibers are made from polyperfluorobutenylvinyl ether; these fibers have larger diameters than glass ones, high numerical apertures, and good properties such as high mechanical flexibility, low cost, low weight, etc. Importantly, progress has been made on the attenuation, which now can be easily brought down to less than 1 dB/meter which represents an insignificant loss considering that the fibers in the present invention will be typically no more than a couple of meters in length. One of the beneficial features of the present invention is that by stimulating photosynthesis, the invention actually reduces atmospheric greenhouse gases (carbon dioxide). Using recyclable plastic materials can lead to an even smaller carbon footprint for the system.

The third component of the system is a diffuser that is attached to the end of or positioned slightly below transmitter/conveyor opposite the light harvester. The job of the diffuser is essentially the reverse of the light harvester. Whereas the light harvester collects solar radiation from a relatively large area (the surface area of the harvester) and concentrates it into the smaller area of the transmitter (e.g., the hollow tube or fiber-optic bundle), the diffuser reverses this process and scatters the light around the inner canopy of the plant. The horticultural advantages of diffused light are well known (Sinclair et al. 40; Hemming et al., 18; Nissim-Levi et al., 28; Hemming, 17; Dueck et al., 13).

Figure 11B:
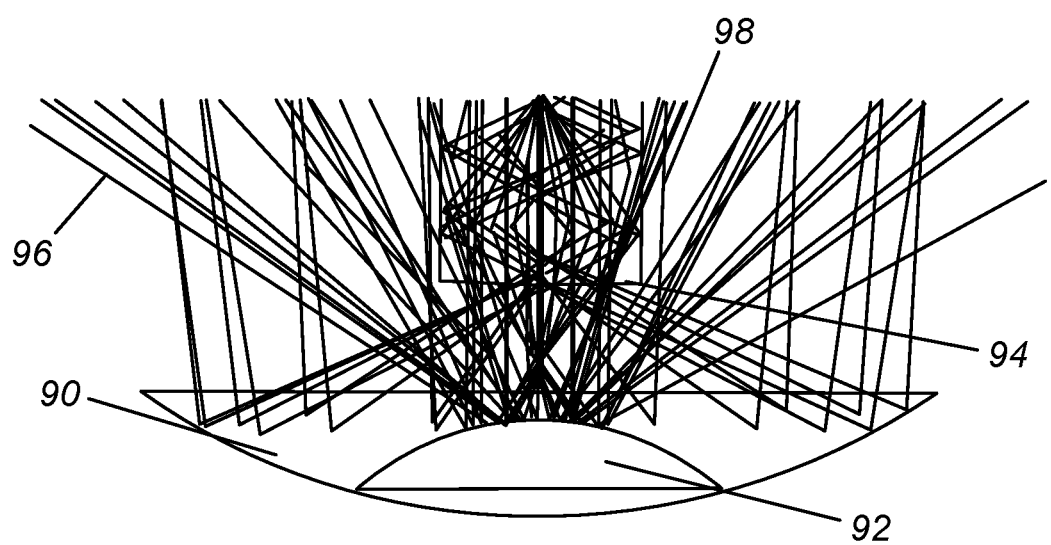
Figure 12:
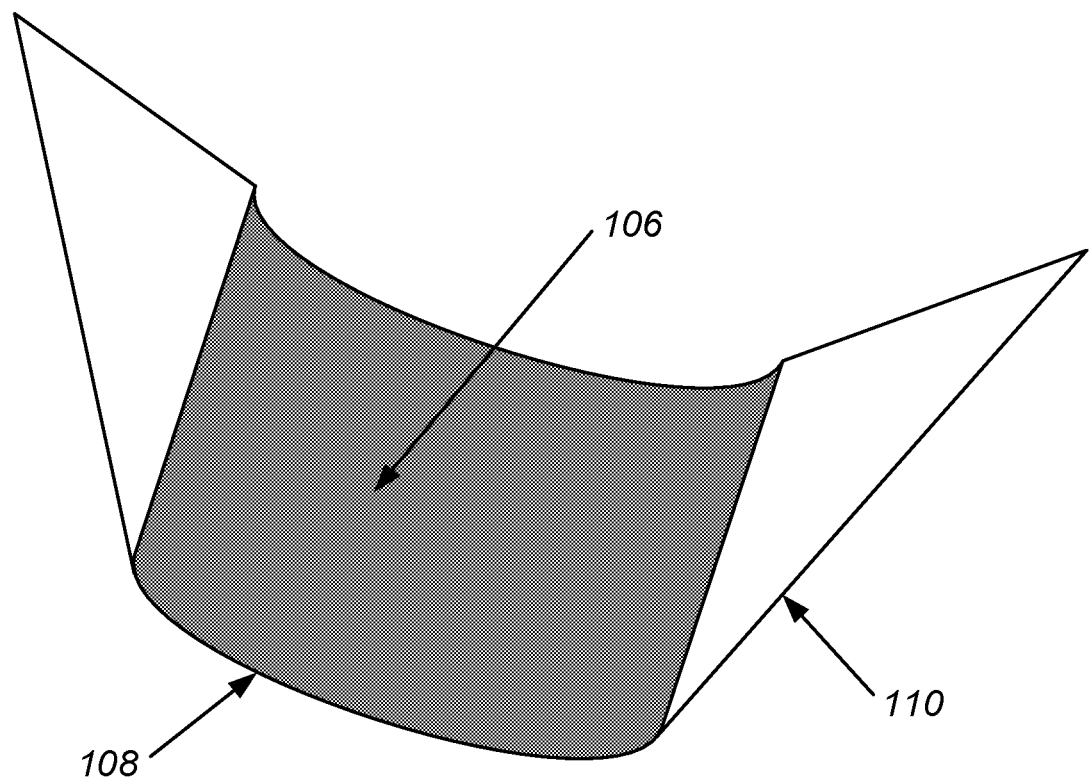
FIG. 12 shows a "hammock linear diffuser made from flexible reflective material.
Figure 13:
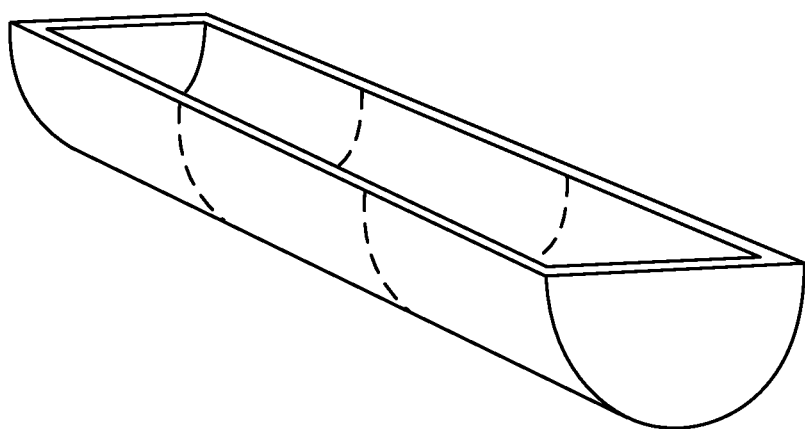
FIG. 13 shows a trough diffuser constructed from rigid reflective materials.

There are a number of designs for the diffuser to allow for customization of the system to various agricultural applications and plant geometries. For non-imaging systems the diffuser can consist of a combination of shaped diffusively reflecting surfaces. As shown in FIGS. 11a and 11b a combination of a large concave mirror 90 and a smaller convex mirror 92 can spread the light rays 96 exiting the aperture 94 of a transfer tube 98. This spread beam is ideal for use in a tree inner canopy such as with a citrus tree. For plants in rows such as grape vines these surfaces can include shapes such as elongated hammock style reflectors of flexible reflective material such as aluminized Mylar are shown in FIG. 12. The flexible reflective Mylar (or similar material) 106 is supported by a wire frame 108. Straps (not shown) can be attached to the peripheral parts 110 of the wire frame to suspend the reflector/diffuser. Linear "troughs" made of rigid reflective materials as shown in FIG. 13. The trough has reflective surfaces—inner or outer depending on the mounting configuration. The unit can be suspended by wires to hang beneath plants or simply rested on the ground. Many other possible geometries will be apparent to those skilled in the art.

For imaging systems where light transfer is via a fiber optic system terminating the transmitter within a diffusing sphere such as an internally coated Mylar balloon or a translucent ball provides an effective diffuser. Depending on the shape of the plant the diffuser can be designed to diffuse light into a number of different three dimensional shapes. For example a conventional citrus tree having a rounded canopy would use a diffuser that projects a sphere or partial sphere of light. A single optical fiber transmitter can terminate in several diffusers arranged within the plant for the best coverage.

There are a number of additions or modifications to the three basic components. As already mentioned the light harvester can be equipped with various mechanical interfaces to allow it to be adjusted to follow the seasonal and/or diurnal changes in solar position. Modification of the spectrum of the transmitted light has also been mentioned above. For this purpose filter materials (either absorptive or interference/reflective) can be applied to the light harvester and/or diffuser. It is also possible to add filtering substances to the optical fibers themselves. For wavelengths (e.g., infrared) that are generally rejected, an optical device such as a prism, dichroic or grating can be used to reject these wavelengths so as not to heat any of the components. In some cases it could be beneficial to add supplementary light sources 97 (e.g. LEDs) to the system to supply light in excess of that available from the sun and/or to augment certain wavelengths of light. This would be used where the economic benefits of the added light outweigh the energy costs. The additional light sources can be aimed into the Light Harvester, directly coupled to the Transmitter or disposed within the Diffuser.

The benefits for the users include increased plant productivity and fruit yield resulting from enhanced photosynthesis, and/or enhanced photo-morphogenetic activities such as flowering induction and bud initiation in the otherwise shaded, inactive parts of the canopy. Also, the supplementary irradiation provided by the invention can result in improved fruit quality: size, color, postharvest quality/storability/shelf life/nutritional value. Because the system makes the plant healthier, one sees improved pest and disease control—possibly achieved through spectral manipulation deterring pests and diseases, and/or enhancing plant resistance to biotic stresses (Karpinski et al., 22; Ben-Yakir et al., 10, 2014; Kong et al., 24). This results in reduced need for applications of agrochemicals such as pesticides, fungicides and plant growth regulators. Because the system is capable of providing PAR without thermal (near infrared (NIR) and infrared) radiation, there is less heating of the plant tissue resulting in a reduction of water use (improved water-use-efficiency). There can also be saving occasioned by lowered use of such traditional practices as pruning, training and use of light-scattering materials. The problem of determining optimum plant spacing is also reduced because the inventive system can be moved and rearranged to accommodate changes caused by plant growth. Finally, the amount and direction of a plant's growth can be controlled by the additional light supplied, and its spectrum, e.g. by reducing tree height for easier harvesting (without sacrificing per tree yield), or by achieving a certain shape—e.g., for decorative purposes (Warrington and Mitchell, 41; Mortensen and Moe, 27; Rajapakse et al., 34; Oren-Shamir et al., 29; Raj apakse and Shahak, 35; Aiga et al., 1).

The system is ideal for perennial crops although it can be used with almost any plant. It can advantageously be applied on individual trees in orchards. It can be used in small fruit "vineyards" (table grapes, wine grapes, kiwi fruit and berries) where horizontal light dispersion can be particularly valuable. It is also useful for protected cultivation of vegetables, ornamental crops, berries (blueberries, raspberries, blackberries, strawberries) and nurseries in greenhouses, net-houses, screen houses, plastic tunnels ("hoop" greenhouses), and "plant factories" (Kozai, 25). In these cases the invented devices will cross the construction roof. The number of units per house area can be readily adjusted according to the cultivated crop.

Use of prototype units provides some idea of how much light the system can readily harvest and deliver to a given location on the plant. PAR reading ($\mu$mol photons/m$^2$/s) were made at mid-day in a citrus grove using a PAR meter (Apogee Instruments, Logan, Utah) with the sensor face held sun-oriented (i.e., perpendicular to the sun's rays). Peak readings in a region without citrus trees were 2040-2060; peak readings between the rows of trees were 1920-1945; while peak readings within the inner canopy of the trees were only 8-15. The experimental light harvester was located at the outer canopy layer so it was partly shaded by adjacent trees. Nevertheless, the peak readings at the exit of the harvester were 1800-2500. Measurements within the canopy at a distance of approximately 150 cm from the exit of the light transmitter were 800-1000. (When the light harvester was placed in full, unobstructed sun light it delivered 8500-9500 photons/m$^2$/s; the upper reading of the meter is 3000 so these figures were obtained by using a neutral density filter on the meter.)

Similarly, in a pistachio orchard, the reading between the rows was 1800-1900, while the reading underneath the trees ranged from 40-350. This is because the canopy of a pistachio tree is less dense than that of a citrus tree. The shade regions receiving the output of the light harvester gave a reading of 2000-3000 as measured on the ground. In a table-grape vineyard the reading away from the vines was about 2000, while the reading beneath the trellis-grown vines was only 13-25. The exit from the light collector/transmitter gave a reading in excess of 3000. Using Mylar diffusers similar to those of FIG. 12 with the meter sensor located adjacent to the illuminated fruit clusters (with the sensor plane making an approximately 45 degree angle with the ground plane) gave a reading of 800-1045, which should be sufficient to significantly affect fruit maturation.

Of course, the devices can also be used in other forms for husbandry where light can have a beneficial effect even though photosynthesis may not be involved. Animal husbandry, particularly poultry cultivation, can be benefited by increased light. Aquiculture is also a natural use for the inventive devices.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

REFERENCES

1. Aiga et al.; U.S. Pat. No. 5,953,857 "Method for controlling plant growth".
2. Antignus, Y. 2014 Management of Air-Borne Viruses by "Optical Barriers" in Protected Agriculture and Open-Field Crops. In Advances in Virus Research: (G. Loebenstein and N. Katis, editors), Vol. 90, pp. 1-33, Burlington: Academic Press.
3. Baranov, V. K. 1965. *Opt. Mekh. Prom.* 6, 1-5.
4. Baranov, V. K. 1966. *Geliotekhnika* 2, 11-14 [English transl.: Parabolotoroidal mirrors as elements of solar energy concentrators. *Appl. Sol. Energy* 2, 9-12.].
5. Baranov, V. K. 1967. "Device for Restricting in One Plane the Angular Aperture of a Pencil of Rays from a Light Source" (in Russian). Russian certificate of authorship 200530, published Oct. 31, 1967.
6. Baranov, V. K., and Melnikov, G. K. 1966. Study of the illumination characteristics of hollow focons. *Sov. J. Opt. Technol.* 33, 408-411.
7. Bauerle W L, Bowden J D 2004. A fiberoptic-based system for integrating photosynthetically active radiation in plant canopies *HortScience* 39 (5): 1027-1029.
8. Baylor, D. A., and Fettiplace, R. (1975). Light and photon capture in turtle receptors. *J. Physiol.* (*London*) 248, 433-464.
9. Ben-Yakir, D. Antignus, Y., Offir, Y. and Shahak, Y. 2012a. Optical Manipulations: An advance Approach for Controlling Sucking Insect Pests. In: Advanced Technologies for Managing Insect Pests (I. Ishaaya, S. R. Palli, R. Horowitz, eds.) Springer Science+Business Media Dordrecht, pp. 249-267.
10. Ben-Yakir, D., Antignus, Y., Offir, Y. and Shahak, Y. 2012b. Colored shading nets impede insect invasion and decrease the incidences of insect transmitted viral diseases in vegetable crops. *Entomol. Exp. et Appl.* 144:249-257.
11. Ben-Yakir, D., Antignus, Y., Offir, Y. and Shahak, Y. 2014. Photoselective nets and screens can reduce insect pests and diseases in agricultural crops. In: Proc. International CIPA Conference 2012 on Plasticulture for a Green Planet (A. Sadka, ed.). Acta Hort. (ISHS) 1015: 95-102.
12. Briggs W. R., Lin C. T. 2012 Photomorphogenesis—from One Photoreceptor to 14: 40 Years of Progress. *Mol. Plant* (2012) 5 (3): 531-532.
13. Dueck, T., Janse, J., Li, T., Kempkes, F. and Eveleens, B. 2012. Influence of diffuse glass on the growth and production of tomato. *Acta Hort.* (ISHS) 956:75-82.
14. Glenn, D. M. (2009) Particle Film Mechanisms of Action That Reduce the Effect of Environmental Stress in 'Empire' Apple. *J. Amer. Soc. Hort. Sci.* 134(3): 314-321
15. Glenn, D. M., Sekutowski, D. G. and Puterka, G. J. (2000); U.S. Pat. No. 6,110,867; "Method for providing enhanced photosynthesis."
16. Harper, D. A., Hildebrand, R. H., Pernlic, R., and Platt, S. R. (1976). Heat trap: An optimized far infrared field optics system. *Appl. Opt.* 15, 53-60.

17. Hemming, S. (2011) Use of Natural and Artificial Light in Horticulture—Interaction of Plant and Technology Proc. 6*th* IS on Light in Horticulture Eds.: E. Goto and S. Hikosaka. *Acta Hort. ISHS* 907, 25-35.
18. Hemming, S., Dueck, T. A., Janse, J., Noort, F. R. van 2008 The Effect of Diffuse Light on Crops. Proc. IS on GreenSys (Eds.: S. De Pascale et al.) *Acta Hort.* 801, ISHS.
19. Hinterberger, H., and Winston, R. (1966a). Efficient light coupler for threshold Cerenkov counters. *Rev. Sci. Instrum.* 37, 1094-1095.
20. Hinterberger, H., and Winston, R. (1966b). Gas Cerenkov counter with optimized light-collecting efficiency. *Proc. Int. Conf. Instrum. High Energy Phys.* 205-206.
21. Holter, M. L., Nudelman, S., Suits, G. H., Wolfe, W. L., and Zissis, G. J. (1962). "Fundamentals of Infrared Technology." Macmillan, New York.
22. Karpinski, S., Gabrysy, H., Mateo, A., Karpinska, B. and Mullineaux, P. M. (2003) Light perception in plant disease defense signaling. *Current Opinion in Plant Biology* 6:390-396
23. Kasperbauer, M. J. (1994). "Light and plant development." In: *Plant-environment Interactions*. Wilkinson R. E (Ed.) Marcel Dekker Inc. NY. pp. 83-123.
24. Kong, Y. Avraham, L., Perzelan, Y., Alkalai-Tuvia, S., Ratner, K., Shahak, Y. and Fallik, E. (2012). Pearl netting affects postharvest fruit quality in 'Vergasa' sweet pepper via light environment manipulation. *Scientia. Hort.,* 150: 290-298.
25. Kozai, T. (2013) Plant factory in Japan—Current situation and perspectives. *Chronica Horticulturae* (ISHS) 53 (2): 8-10.
26. Longstaff; U.S. Pat. No. 5,022,181 "Method and apparatus for use in plant growth promotion and flower development".
27. Mortensen L. M. and Moe, R. (1992) Effects of selective screening of the daylight spectrum, and of twilight on plant growth in greenhouses. *Acta Hort.* 305: 103-108.
28. Nissim-Levi, A., Farkash, L., Hamburger, D., Ovadia, R., Forrer, I., Kagan, S. and Oren-Shamir, M. (2008) Light-scattering shade net increases branching and flowering in ornamental pot plants. *J. Hort. Sci. Biotech.* 83, 9-14.
29. Oren-Shamir M., Gussakovsky E. E., Shpiegel E., Nissim-Levi A, Ratner K., Ovadia R.,
Giller Y. E. and Shahak Y. 2001, Coloured shade nets can improve the yield and quality of green decorative branches of *Pittosporum variegatum*. *J. Hort. Sci. Biotech.* 76: 353-361.
30. Ploke, M. (1967). Lichtführungseinfichtungen mit starker Konzentrationswirkung. *Optik* 25, p 31.
31. Ploke, M. (1969) "Axially Symmetrical Light Guide Arrangement." German Patent Application #14722679.
32. Rabl, A., and Winston, R. (1976). Ideal concentrators for finite sources and restricted exit angles. *Appl. Opt.* 15, 2880-2883.
33. Rabe, E. (2004) Citrus tree spacing and tree shape: Concept, effect on early production profile and fruit quality aspects—An overview. Int. Soc. Citriculrure 1:297-301.
34. Rajapakse N. C., Young, R. E., McMahon M. J. and Oi, R. (1999). Plant height control by photoselective filters: current status and future prospects. *Hortechnology,* 9: 618-624.
35. Rajapakse, N.C. and Shahak, Y. (2007) Light quality manipulation by horticulture industry. In: *Light and Plant Development* (G. Whitelam and K. Halliday, eds.), pp 290-312, Blackwell Publishing, UK. (A book chapter).
36. Senthilkumar S and Yasodha N, "Design and Development of a Three Dimensional Compound Parabolic Concentrator and Study of Optical and Thermal Performance.", 2012, Intl. J. Energy Sci. Vol. 2 no. 2 p 64-68.
37. Shahak, Y. (2014) Photoselective netting: an overview of the concept, R&D and practical implementation in agriculture. In: Proc. International CIPA Conference 2012 on Plasticulture for a Green Planet (A. Sadka, ed.). *Acta Hort.* (ISHS) 1015: 155-162.
38. Shahak, Y., Oren-Shamir, M., Gal, E., Bachar, A., Guthman, Y., Gemure, A. and Gussakovsky, E. E.; WO/2002/019800 (PCT/IL01/00851) "New technology for improving the utilization of sunlight by plants."
39. Shahak, Y., Ratner, K., Giller, Y. E., Zur, N. Or, E., Gussakovsky, E. E., Stern, R., Sarig, P., Raban, E., Harcavi, E., Doron, I. and Greenblat-Avron, Y. (2008). Improving solar energy utilization, productivity and fruit quality in orchards and vineyards by photoselective netting. In: Proc. 27*th* IHC—Enhancing Econ. & Environ. Sustain. of Fruit Prod. in a Global Econ. (J. W. Palmer, Ed-in-Chief) *Acta Hort.* 772: 65-72.
40. Sinclair, T. R., Shiraiwa, T. and Hammer, G. L. (1992) Variation in Crop Radiation-Use Efficiency with Increased Diffuse Radiation. *Crop Sci.* 32:1281-1284.
41. Warrington, I. J. and Mitchell, K. J. (1976) The influence of blue- and red-biased light spectra on the growth and development of plants. *Agric. Meteorol.* 16: 247-262.
42. Williamson, D. E. (1952). Cone channel condenser optics. *J. Opt. Soc. Am.* 42, 712-715.
43. Winston, R. 1970. Light collection within the framework of geometrical optics. *J. Opt. Soc. Am.* 60, 245-247.
44. Winston, R. 1974. Principles of solar concentrators of a novel design. *Sol. Energy* 16, 89-95.
45. Winston, R. (1976a). U.S. Pat. No. 3,923,381, "Radiant Energy Concentration."
46. Winston, R. (1977b). U.S. Pat. No. 4,003,638, "Radiant Energy Concentration."
47. Winston, R. (1977b). U.S. Pat. No. 4,002,499, "Cylindrical Concentrators for Solar Energy."
48. Winston, R., and Hinterberger, H. (1975). Principles of cylindrical concentrators for solar energy. Sol. Energy 17, 255-258.
49. Witte, W. (1965). Cone channel optics. *Infrared Phys.* 5, 179-185.

What is claimed is:

1. A system for delivering diffused light to an inner canopy of a plant and thereby modifying growth and development of the plant, the system comprising:
    a light reflector for collecting and concentrating solar light source energy from a solar light source above and outside of an inner canopy of the plant;
    a light transmitter comprising an internally reflective light pipe in optical communication with the light reflector for conducting the concentrated solar light source energy from the light reflector to the inner canopy of the plant; and
    a light diffuser in optical communication with the light transmitter placed within the plant's inner canopy for receiving the concentrated solar light source energy from the light transmitter, diffusing and re-radiating the solar light source energy so as to illuminate a portion of the inner canopy of the plant, thereby modifying the growth and development of the plant.

2. The system of claim 1, wherein the light transmitter is formed of plastic, aluminized cardboard, or glass.

3. The system of claim 1, further comprising a filter in at least one of the light reflector, the light transmitter, or the light diffuser, wherein the filter modifies the spectral quality of the collected and concentrated light source energy.

4. The system of claim 1, wherein the diffuser comprises a diffusively reflecting surface.

* * * * *